(12) United States Patent
Bowden et al.

(10) Patent No.: US 10,176,113 B2
(45) Date of Patent: Jan. 8, 2019

(54) SCALABLE INDEXING

(71) Applicant: HEWLETT PACKARD ENTERPRISE DEVELOPMENT LP, Houston, TX (US)

(72) Inventors: Paul Bowden, Berlin, MA (US); Arthur J. Beaverson, Boxborough, MA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 489 days.

(21) Appl. No.: 14/519,722

(22) Filed: Oct. 21, 2014

(65) Prior Publication Data

US 2015/0039907 A1 Feb. 5, 2015

Related U.S. Application Data

(63) Continuation of application No. 12/823,452, filed on Jun. 25, 2010, now Pat. No. 8,880,544, which is a (Continued)

(51) Int. Cl.
*G06F 17/30* (2006.01)
*G06F 12/1045* (2016.01)
(Continued)

(52) U.S. Cl.
CPC ...... *G06F 12/1054* (2013.01); *G06F 12/0246* (2013.01); *G06F 12/0864* (2013.01);
(Continued)

(58) Field of Classification Search
CPC ............. G06F 12/1054; G06F 12/0246; G06F 12/0864; G06F 12/0875; G06F 12/1408;
(Continued)

(56) References Cited

U.S. PATENT DOCUMENTS 6,128,346 A 10/2000 Suarez et al.
6,412,080 B1 6/2002 Fleming et al.
(Continued)

FOREIGN PATENT DOCUMENTS

CN 1297623 A 5/2001
CN 1617113 A1 5/2005
(Continued)

OTHER PUBLICATIONS

Apr. 4, 2014 Office Action in corresponding JP Application 2012-517764 (English translation and first page).
(Continued)

*Primary Examiner* — Tyler Torgrimson
(74) *Attorney, Agent, or Firm* — Hewlett Packard Enterprise Patent Department

(57) ABSTRACT

Method and apparatus for constructing an index that scales to a large number of records and provides a high transaction rate. New data structures and methods are provided to ensure that an indexing algorithm performs in a way that is natural (efficient) to the algorithm, while a non-uniform access memory device sees IO (input/output) traffic that is efficient for the memory device. One data structure, a translation table, is created that maps logical buckets as viewed by the indexing algorithm to physical buckets on the memory device. This mapping is such that write performance to non-uniform access SSD and flash devices is enhanced. Another data structure, an associative cache is used to collect buckets and write them out sequentially to the memory device as large sequential writes. Methods are used to populate the cache with buckets (of records) that are required by the indexing algorithm. Additional buckets may be read from the memory device to cache during a demand read, or by a scavenging process, to facilitate the generation of free erase blocks.

30 Claims, 16 Drawing Sheets

Related U.S. Application Data continuation-in-part of application No. 12/823,922, filed on Jun. 25, 2010, now Pat. No. 8,478,799.

(60) Provisional application No. 61/269,623, filed on Jun. 26, 2009.

(51) Int. Cl.
| | |
|---|---|
| *G06F 12/02* | (2006.01) |
| *G06F 12/0864* | (2016.01) |
| *G06F 12/0875* | (2016.01) |
| *G06F 12/14* | (2006.01) |

(52) U.S. Cl.
CPC ...... *G06F 12/0875* (2013.01); *G06F 12/1408* (2013.01); *G06F 17/30097* (2013.01); *G06F 17/30949* (2013.01); *G06F 17/30952* (2013.01); *G06F 2212/2542* (2013.01); *G06F 2212/402* (2013.01); *G06F 2212/452* (2013.01); *G06F 2212/502* (2013.01); *G06F 2212/6032* (2013.04); *G06F 2212/7211* (2013.01)

(58) Field of Classification Search
CPC ......... G06F 17/30097; G06F 17/30949; G06F 17/30952; G06F 2212/6032; G06F 2212/2542; G06F 2212/402; G06F 2212/452; G06F 2212/502; G06F 2212/7211
See application file for complete search history.

(56) References Cited

U.S. PATENT DOCUMENTS

| | | | |
|---|---|---|---|
| 6,453,404 | B1 | 9/2002 | Bereznyi et al. |
| 6,912,645 | B2 | 6/2005 | Dorward et al. |
| 7,062,490 | B2 | 6/2006 | Adya et al. |
| 7,103,595 | B2 | 9/2006 | Ariastasiadis et al. |
| 7,139,781 | B2 | 11/2006 | Young |
| 7,266,555 | B1 | 9/2007 | Coates et al. |
| 7,328,217 | B2 | 2/2008 | Borthakur et al. |
| 7,454,592 | B1 | 11/2008 | Shah |
| 7,509,473 | B2 | 3/2009 | Horn et al. |
| 7,657,500 | B2 | 2/2010 | Shavit et al. |
| 7,747,663 | B2 | 6/2010 | Atkin et al. |
| 7,814,078 | B1 | 10/2010 | Forman |
| 7,827,182 | B1 | 11/2010 | Panigrahy |
| 7,870,122 | B2 | 1/2011 | Nath et al. |
| 7,877,426 | B2 | 1/2011 | Grubbs et al. |
| 8,028,106 | B2 | 9/2011 | Bondurant et al. |
| 8,140,625 | B2 | 3/2012 | Dubnicki et al. |
| 8,140,786 | B2 | 3/2012 | Bunte et al. |
| 8,145,865 | B1 | 3/2012 | Longinov et al. |
| 8,195,636 | B2 | 6/2012 | Stager et al. |
| 8,271,564 | B2 | 9/2012 | Dade |
| 8,478,799 | B2 | 7/2013 | Beaverson et al. |
| 8,560,503 | B1 | 10/2013 | McManis |
| 8,583,657 | B2 | 11/2013 | Shukla |
| 2002/0194209 | A1 | 12/2002 | Bolosky et al. |
| 2004/0148306 | A1 | 7/2004 | Moulton et al. |
| 2005/0108496 | A1 | 5/2005 | Elnozahy et al. |
| 2005/0187898 | A1 | 8/2005 | Chazelle et al. |
| 2006/0036898 | A1 | 2/2006 | Doering |
| 2006/0265568 | A1 | 11/2006 | Burton |
| 2006/0294163 | A1 | 12/2006 | Armangau et al. |
| 2007/0094312 | A1 | 4/2007 | Sim-Tang |
| 2007/0266059 | A1 | 11/2007 | Kitamura |
| 2007/0277227 | A1 | 11/2007 | Brendel |
| 2007/0300008 | A1 | 11/2007 | Rogers et al. |
| 2008/0228691 | A1 | 9/2008 | Shavit et al. |
| 2008/0270436 | A1 | 10/2008 | Fineberg |
| 2009/0037456 | A1 | 2/2009 | Kirshenbaum |
| 2009/0049335 | A1 | 2/2009 | Khatri et al. |
| 2009/0067819 | A1 | 3/2009 | Tanaka et al. |
| 2009/0106486 | A1 | 4/2009 | Kim et al. |
| 2009/0198902 | A1 | 8/2009 | Khmelnitsky et al. |
| 2009/0271402 | A1 | 10/2009 | Srinivasan et al. |
| 2010/0115175 | A9 | 5/2010 | Zhuang et al. |
| 2010/0121865 | A1 | 5/2010 | Vaid et al. |
| 2010/0131480 | A1 | 5/2010 | Schneider |
| 2010/0274772 | A1 | 10/2010 | Samuels |
| 2011/0179219 | A1 | 7/2011 | Ma et al. |
| 2013/0227195 | A1 | 8/2013 | Beaverson et al. |

FOREIGN PATENT DOCUMENTS

| | | |
|---|---|---|
| CN | 101369240 A | 2/2009 |
| JP | 2004213263 A | 7/2004 |
| JP | 2007305122 A | 11/2007 |
| JP | 200964386 A | 3/2009 |
| WO | 2009007251 A2 | 1/2009 |

OTHER PUBLICATIONS

Wu, Chin-Hsien, A Flash Translation Layer for Huge-Capacity Flash Memory Storage Systems, Computer Systems and Applications, 2008, AICCSA 2008, IEEE/ACS International Conference Apr. 4, 2008, p. 100-107.

Nov. 13, 2013 Office Action in corresponding CN 2010 80033622.4 (English translation).

Int'l. Search Report and Written Opinion dated Nov. 10, 2010 in related Int'l. Appln. No. PCT/US2010/039966.

Int'l. Search Report and Written Opinion dated Aug. 26, 2010 in related Int'l. Appln. No. PCT/US2010/040058.

Roh, H., et al. "An Efficient Hash Index Structure for Sold State Disks," Proceedings of 2008 Int'l Conf. on Information and Knowledge Engineering IKE 2008, Las Vegas, NV pp. 256-261.

Gal E., et al. "Algorithms and Data Structurs for Flash Memories," ACM Computing Surveys, vol. 37, No. 2, Jun. 1, 2005, pp. 138-163, XP-002453935.

Wu C., et al. (An Efficient B-Tree Layer for Flash-Memory Storage Systems, Real-Time and Embedded Computing Systems and Applications [Lecture Notes in Computer Science; LNCS], Springer—Verlag, Berlin/Heidelberg, Apr. 8, 2004, pp. 409-430, XP019005407.

Quinlan, S. et al. "Venti: a new approach to archival storage" Proceedings of Fast, Conference on File and Storage Technologies, Jan. 28, 2002, pp. 1-13, XP002385754.

Severance, et al., Distributed Linear Hashing and Parallel Projection in Main Memory Databases, Proceedings of the 16th VLDB Conference, Brisbane, Australia, 1990, retrieved on Sep. 16, 2014, retrieved from the Internet <URL: http://waterfallmodelsucks.com/dr-chuck/papers/1990/1990-vldb-16-charles-severance-main-menory-databse.pdf>.

Dietzfelbinger, et al. "Balanced allocation and dictionaries with tightly packed constant size bins," Theoretical Computer Science, Amsterdam, NL, vol. 380, No. 1-2, May 16, 2007 (May 16, 2007), pp. 47-68, XP022081106, ISSN: 3304-3975, DOI: 10.106/J.TCS.2007.02.054.

USPTO PTAB Decision Denying Institution of Inter Partes Review entered Mar. 22, 2017, *Springpath, Inc. v. SimpliVity Corp.*, Case IPR2016-01779, U.S. Pat. No. 8,478,799 B2.

USPTO PTAB Patent Owner's Preliminary Response dated Dec. 27, 2016, *Springpath, Inc. v. SimpliVity Corp.*, Case IPR2016-01779, U.S. Pat. No. 8,478,799 B2 (SimpliVity Exhibits 2001-2009 listed below).

Wikipedia: "Object Storage" (available at https://en.wikipedia.org/wiki/Object_storage) (last visited Dec. 6, 2016), SimpliVity Exhibit 2001, *Springpath v. SimpliVity* IPR2016-01779.

Webopedia: "Inode" (available at http://www.webopedia.com/TERM/I/inode.html) (last visited Dec. 20, 2016), SimpliVity Exhibit 2002, *Springpath v. SimpliVity* IPR2016-01779.

Presentation: "Object Storage technology," Storage Networking Industry Association, 2013 (available at http://www.snia.org/sites/default/education/tutorials/2013/spring/file/BrentWelch_Object_Storage_Technology.pdf) (last visited Dec. 22, 2016), SimpliVity Exhibit 2003, *Springpath v. SimpliVity* IPR2016-01779.

(56) References Cited

OTHER PUBLICATIONS

"Object Storage versus Block Storage: Understanding the Technology Differences," Aug. 14, 2014 (available at http://www.druva.com/blog/object-storage-versus-block-storage-understanding-technology-differences/) (last visited Dec. 22, 2016), SimpliVity Exhibit 2004, *Springpath* v. *SimpliVity* IPR2016-01779.
"Understanding Object Storage and Block Storage use cases," Jul. 20, 2015 (available at http://cloudacademy.com/blog/object-storage-block-storage/) (last visited Dec. 22, 2016), SimpliVity Exhibit 2005, *Springpath* v. *SimpliVity* IPR2016-01779.
"OBFS: A File System for Object-based Storage Devices." Feng, et al., 2004, SimpliVity Exhibit 2006, *Springpath* v. *SimpliVity* IPR2016-01779.
"Oasis: An active storage framework for object storage platform," Xie, et al., 2015, SimpliVity Exhibit 2007, *Springpath* v. *SimpliVity* IPR2016-01779.
Wikipedia: "Namespace" (available at https://en.wikipedia.org/wiki/Namespace) (last visited Dec. 6, 2016), SimpliVity Exhibit 2008, *Springpath* v. *SimpliVity* IPR2016-01779.
Weopedia: "Namespace" (available at http://www.webopedia.com/TERM/N/namespace.html) (last visited Dec. 20, 2016), SimpliVity Exhibit 2009, *Springpath* v. *SimpliVity* IPR2016-01779.
USPTO PTAB Decision Denying Institution of Inter Partes Review entered Mar. 22, 2017, *Springpath, Inc.* v. *SimpliVity Corp.*, Case IPR2016-01780, Patent 8,478,799 B2.
USPTO PTAB Patent Owner's Preliminary Response dated Dec. 27, 2016, *Springpath, Inc.* v. *SimpliVity Corp.*, Case IPR2016-01780, U.S. Pat. No. 8,478,799 B2 (SimpliVity Exhibits 2001-2009 identical to IPR2016-01779 and previously submitted).
Petition for Inter Partes Review of U.S. Pat. No. 8,478,799 before the USPTO Patent Trial and Appeal Board dated Sep. 14, 2016, Case IPR2016-01779.
Declaration of Darrell D.E.Long, PhD. Regarding U.S. Pat. No. 8,478,799 dated Sep. 14, 2016, Case IPR2016-01779 (Springpath Exhibit 1002).
LI, et al., Secure Untrusted Data Repository (SUNDR), OSDI '04: 6th Symposium on Operating Systems Design and Implementation, pp. 122-136, USENIX Association (Springpath Exhibits 1003 & 1103).
Sandberg, et al., Design and Implementation of the Sun Network Filesystem, Sun Microsystems, Mountain View, CA, (12 pp.) (Springpath Exhibits 1004 & 1116).
US Patent and Trademark Office non-final Office Action dated Aug. 30, 2012 in U.S. Appl. No. 12/823,922 (Springpath Exhibits 1006 & 1106).
Response to USPTO non-final Office Action of Aug. 30, 2012 filed Dec. 18, 2012 in U.S. Appl. No. 12/823,922 (Springpath Exhibits 1009 & 1109).
Quinlan, et al., Venti: a new approach to archival storage, Bell Labs, Lucent Technologies, 1-13 pp (Springpath Exhibits 1008 & 1108).
US Patent and Trademark Office final Office Action dated Feb. 22, 2013 in U.S. Appl. No. 12/823,922 (Springpath Exhibits 1010 & 1110).
Response to USPTO final Office Action of Feb. 22, 2013 filed May 8, 2013 in U.S. Appl. No. 12/823,922 (Springpath Exhibits 1012 & 1112).
Best, et al., How the Journaled File System handles the on-disk layout, May 2000, IBM: developerWorks: Linux library/Open source library Internet download Apr. 18, 2001; http://swgiwas001.sby.ibm.com/developerworks/library/jfslayout/index1.html (Springpath Exhibits 1011 & 1111).
US Patent and Trademark Office Notice of Allowance dated May 29, 2013 in U.S. Appl. No. 12/823,922 (Springpath Exhibits 1013 & 1113).
Petition for Inter Partes Review of U.S. Pat. No. 8,478,799 before the USPTO Patent Trial and Appeal Board dated Sep. 14, 2016, Case IPR2016-01780.
Declaration of Darrell D.E.Long, Ph.D. Regarding U.S. Pat. No. 8,478,799 dated Sep. 14, 2016, Case IPR2016-01780 (Springpath Exhibit 1102).

IEEE The Open Group, 1003.1TM Standard for Information Technology—Portable Operating System Interface (POSIX (R)) System Interfaces, Issue 6, IEEE Std 1003.1-2001, Approved Sep. 12, 2001 The Open Group (2 pp.) (Springpath Exhhibits 1014 & 1114).
IEEE The Open Group, 1003.1TM Standard for Information Technology—Portable Operating System Interface (POSIX (R)) Base Definitions, Issue 6, IEEE Std 1003.1-2001, Approved Sep. 12, 2001 The Open Group (8 pp.) (Springpath Exhibits1015 & 1115).
Petition for Inter Partes Review of U.S. Pat. No. 8,478,799 filed Aug. 11, 2017, case 9PR2017-0193:3, 92 pages, The citations from PIR2017-01933 are submiited herewith below.
Prosecution History of the U.S. Pat. No. 8,478,799, 576 pages.
U.S. Appl. No. 61/269,633, 32 pages.
Prashant Shenoy, "Declaration of Prashant Shenoy, PhD, Linder 37 C.F.R. § 1.68 in Support of Petition for Inter Partes Review of U.S. Pat. No. 8,478,799", dated Aug. 11, 2017, 196 pages.
"Curriculum Vitae of Dr. Prashant Shenoy", 2017, 31 pages.
Athicha Muthitachamen, et al., "Ivy: A Read/Write Peer-to-Peer File System." Proceedings of the 5th Symposium on Operating Systems Design and Implementation (OSDI '02), Operating Systems Review, vol. 36, issue SI (Winter 2002), 21 pages.
Frank Dabek, et al., "Wide-area cooperative storage with CFS," Proceedings of the 18th ACM Symposium on Operating Systems Principles (SOSP'01), Operating Systems Review, vol. 35, No. 5 (Dec. 2001), pp. 1-19.
Nitin Agrawal, et al.., "Design Tradeoffs for SSD Performance," USENIX'08: 2008 USENIX Annual Technical Conference, Jun. 25, 2008, pp. 57-70.
Marshall Kirk McKusick, et al., "The Design and Implementation of the FreeBSD Operating System", FreeBSD version 5.2, CSCO-1011, (2005), pp.1-43.
Josh Cates, "Robust and Efficient Data Management for a Distributed Flash Table", Jun. 2003, 64 pages.
Marice J. Bach, The Design of the UNIX Operating System (1986), 8 pages.
Prashant Shenouy, et al., "Symphony: An Integrated Multimedia File System," Proceedings of SPIE 3310, Multimedia Computing and Networking 1998, pp. 124-138.
Garth Gibson, et al., "A Cost-Effective, High-Bandwidth Storage Architecture," Proceedings of the 8th Conference on Architectural Support for Programming Languages and Operating Systems, 1998; pp. 92-103.
Mike Mesnier, et al., "Object-Based Storage," IEEE Communication Magazine, Aug. 2003, pp. 84-90.
R. Rivest, "The MD5 Message-Digest Algorithm," Request for Comments 1321, Internet Engineering Task Force, CSCO-1017, Apr. 1992, 21 pages.
Sean Quinlan, et al., "Venti: a new approach to archival storage," Proceedings of Fast 2002 Conference of File and Storage Technologies, Jan. 28-30, 2002, pp. 1-14.
Bruce Eckel, "C++ Inside & Out", 1992, 6 pages.
Mendel Rosenblum, "The Design and Implementation of a Log Logstructuredfile System", Kluwer Academic Publishers, 1995, 3 pages.
Webster'S New World Computer Dictionary, 10th Ed. 2003, 3 pages.
Microsoft Computer Dictionary, 5th Ed., 2002, 7 pages.
"AMD Athlon Processor", ADM Technical Brief, Publication # 22054, Rev. D, Issue date Dec. 1999, 10 pages.
Stevens, et al., "The first collision for full SHA-1," international Association for Cryptology Research 2017, pp. 570-596.
Andrew S. Tanenbaum, "Modern Operating Systems", 2d Ed., 2001, 7 pages.
Alan Freedman, "Computer Desktop Encyclopedia 9th Ed", Osborne/McGraw-Hill, 2001, 7 pages.
Sang-Won Lee, et al., "A Case for Hash Memory SSD in Enterprise Database Applications," Proceedings of the 2008 ACM SIGMOD International Conference on Management of Data, Jun. 9-12, 2008, pp. 1075-1086.
Bruce Schneier, "Applied Cryptography, 2d Ed, Protocol, Algorithms, and Source Code in C", John Wiley & Sons, Inc., 1996, 4 pages.

(56) References Cited

OTHER PUBLICATIONS

Martin Piacek, "Storage Exchange: A Global Platform for Trading Distributed Storage Services," Master of Engineering Science Thesis, The University of Melbourne, Australia, Jul. 2006, 185 pages.
Ragib Hasan, et al., "A Survey of Peer-to-Peer Storage Techniques for Distributed File Systems," International Conference on Information Technology: Coding and Computing, 2005, 9 pages.
"Frequently Asked Questions for FreeBSD 2.X, 3.X and 4.X", unknown date, 8 pages,. Archived at https://web.archive.org/web/20020404064240/http://www.freebsd.org:80/doc/en_US.ISO8859-1/books/faq/install.html.
"Preliminary Information, AMD Athion, Processor Module Data Sheet", AMD Athlon, Publication #21016, Rev. M, issue Date:Jun. 2000, 74 pages.
AMD Athion™, "Processor Quick Reference FAQ", Feb. 3. 2000, 12 pages.
"MARC Record Information for Operating Systems Review"—Proceedings of the Fifth ACM Symposium on Operating Systems Design and implementation (OSDI'02), available at the WRLC online catalog, accessed Jul. 20. 2017, 3 pages.
"Bibliographic Record Information for Operating Systems Review"—Proceedings of the Fifth ACM Symposium on Operating Systems Design and Implementation (OSDI'02), Dec. 9-11, 2002, available at the WRLC online catalog, accessed Jul. 20, 2017, 2 pages.
"MARC Record Information for Operating Systems Review"—Proceedings of the 18th ACM Symposium on Operating Systems Principies (SOSP'01), 2001, available at the online catalog of the Library of Congress, accessed Jul. 31, 2017, 3 pages.
"Bibliographic Record information for Operating Systems Review"—Proceedings of the 18th ACM Symposium on Operating Systems Principles (SOSP'01), 2001, available at the online catalog of the Library of Congress, accessed Jul. 31, 2017, 3 pages.
"Operating Systems Review"—Proceedings of the 18th ACM Symposium on Operating Systems Principles (SOSP'01), vol. 35, No. 5, pp. 202-215, Oct. 21-24, 2001, obtained from a CD-ROM from Auburn University, 11 pages.
"MARC Record Information for Operating Systems Review"—Proceedings of the 18th ACM Symposium on Operating Systems Principles (SOSP'01), Oct. 21-24, 2001, CD-ROM, available at the Auburn University Library online catalog, accessed Jul. 28, 2017, 1 page.
"Bibliographic: Record information for Operating Systems Review"—Proceedings of the 18th ACM Symposium on Operating Systems Prindpies (SOSP'01) CD-ROM, Oct. 21-24, 2001, available at the Auburn University Library online catalog, accessed Jul. 28, 2017, 1 pages.
"Scan of CD-ROM and CD-ROM Case, Operating Systems Review"—Proceedings of the 18th ACM Symposium on Operating Systems Principles (SOSP'01), Oct. 21-24, 2001, CD-ROM obtained from the Auburn University Library, 1 page.
Byung-Gon Chun, at al., "Efficient Replica Maintenance for Distributed Storage Systems," USENIX Association, Proceedings of NSDI '06: 3rd Symposium on Networked Systems Design & Implementation, 2006, pp. 45-58.
Dabek., F., et al., "Wide-area cooperative storage with CFS," Operating Systems Review—Proceedings of the 18th ACM Symposium on Operating Systems Principles (SOSP'01), vol. 35, No. 5, 2001, pp. 202-215.
Ingrid Hsieh-Yee, "Declaration of Ingrid Hsieh-Yee, PhD, Under 37 C.F.R. § 1.68 in Support of Petition for Inter Partes Review of U.S. Pat. No. 8,478,799", dated Aug. 10, 2017, 77 pages.
Michele Nelson, "Declaration dated Aug. 9, 2017, of Michele Nelson, Under 37 C.F.R. § 1.68", dated Aug. 9, 2017, 92 pages.
David Bader, "Declaration of David Bader, Under 37 C.F.R. § 1.68", dated Aug. 10, 2017, 31 pages.
MARC Record Information, "The Design and Implementation of the FreeBSD Operating System", 2005, 2 pages, available at the online catalog of the Library of Congress, accessed Aug. 3, 2017.
Bibliographic Record information, "The Design and Implementation of the FreeBSD Operating System", 2005, 2 pages, available at the online catalog of the Library of Congress, accessed Aug. 3, 2011.
Marshall Kirk McKusick, et al,, "The Design and Implementation of the FreeBSD Operating System", FreeBSD version 5.2, 2005, 32 pages, obtained from the George Mason University Library.
MARC Record information, "The Design and Implementation of the FreeBSD Operating System" 2005, 2 pages, available at the online catalog of the George Mason University Library, accessed Aug. 3, 2017.
Bibliographic Record information for "The Design and Implementation of the FreeESD Operating System", 2005, 2 pages, available at the online catalog of the George Mason University Library, accessed Aug. 3, 2017.
IBM, AIX 5L Version 5.2 General Programming Concepts: Writing and Debugging Programs, 2004 ("GPC") (SPR00000788-SPR00001403).
IBM AIX 5L Version 5.2 System Management Concepts: Operating System and Devices, 2004 ("SMC") (SPR00001404-SPR00001593).
Petition for Inter Partes Review of U.S. Pat. No. 8,478,799 filed Aug. 11, 2017, case IPR2017-01933, 92 pages.
Prosecution History of the U.S. Pat. No. 8,478,799.
U.S. Appl. No. 61/269,633.
Declaration of Dr. Prashant Shenoy Under 37 C.F.R. § 1.68.
Curriculum Vitae of Dr. Prashant Shenoy.
Athictia Muthitacharoen, et al., "Ivy: A Read/Write Peer-to-Peer File System." Proceedings of the 5th Symposium on Operating Systems Design and Implementation (OSDI '02), Operating Systems Review, vol. 36, issue SI (Winter 2002), 21 pages.
Frank Dabek, et al., "Wide-area cooperative storage with CFS," Proceedings of the 18th ACM Symposium on Operating Systems Principles (SOSP'01), Operating Systems Review, vol. 35, No. 5 (Dec. 2001).
Nitin Agrawal, et al.., "Design Tradeoffs for SSD Performance," USENIX'08: 2008 USENIX Annual Technical Conference (Jun. 25, 2008).
Marshall Kirk McKusick, et al., The Design and Implementation of the FreeBSD Operating System (2005).
"Robust and Efficient Data Management for a Distributed Hash Table" by Josh Cates ("Cates"), 2003.
Marice J. Bach, The Design of the UNIX Operating System (1986) (selected pages).
Prashant Shenoy, et al., "Symphony: An Integrated Multimedia File System," Proceedings of SPIE 3310, Multimedia Computing and Networking 1998.
Garth Gibson, et al., "A Cost-Effective, High-Bandwidth Storage Architecture," Proceedings of the 8th Conference on Architectural Support for Programming Languages and Operating Systems (1988).
Mike Mesnier, et al., "Object-Based Storage," IEEE Communication Magazine (Aug. 2003).
R. Rivest, "The MD5 Message-Digest Algonthm," Request for Comments 1321, Internet Engineering Task Force (Apr. 1992).
Sean Quinlan, et al., "Venti: a new approach to archival storage," Proceedings of Fast 2002 Conference of File and Storage Technologies (2002).
Bruce Eckel, C++ Inside & Out (1992) (selected pages).
"Mendel Rosenblum, The Design and Implementation of a Log Logstructuredfile System (1995) (selected pages)."
Webster's New World Computer Dictionary, 10th Ed. (2003) (selected pages).
Microsoft Computer Dictionary, 5th Ed. (2002) (selected pages).
AMD Athlon Processor Technical Brief, Rev. D (Dec. 1999).
Stevens, et al., "The first collision for full SHA-1," Cryptology ePrint Archive, Report 2017/190 (2017).
Andrew S. Tanenbaum, Modern Operating Systems, 2d Ed, (2001) (selected pages).
Alan Freedman, Computer Desktop Encyclopedia, 9th Ed. (2001) (selected pages).
Sang-Won Lee. et al., "A Case for Hash Memory SSD in Enterprise Database Applications," Proceedings of the 2008 ACM SIGMOD International Conference on Management of Data (2008).

(56) References Cited

OTHER PUBLICATIONS

Bruce Schneier, Applied Cryptography, 2d Ed. (1996) (selected pages).
Martin Placek, "Storage Exchange: A Global Platform for Trading Distributed Storage Services," Master of Engineering Science Thesis, The University of Melbourne (Jul. 2006).
Ragib Hasan, et al., "A Survey of Peer-to-Peer Storage Techniques for Distributed File Systems," International Conference on Information Technology: Coding and Computing (2005).
Frequently Asked Questions for FreeBSD 2.X, 3.X and 4.X, archived at http://web.archive.org/web/20020404064240/http://www.freebsd.org:80/doc/en_US.ISO8859-1/books/faq/install.html.
AMD Athlon Processor Module Data Sheet, Rev. M (Jun. 2000).
AMD Athlon™ Processor Quick Reference FAQ (Feb. 3, 2000).
MARC Record Information for Operating Systems Review—Proceedings of the Fifth ACM Symposium on Operating Systems Design and Implementation (OSDI'02), available at the WRLC online catalog, accessed Jul. 20, 2017.
Bibliographic Record Information for Operating Systems Review—Proceedings of the Fifth ACM Symposium on Operating Systems Design and implementation (OSDI'02), available at the WRLC online catalog, accessed Jul. 20, 2017.
MARC Record Information for Operating Systems Review—Proceedings of the 18th ACM Symposium on Operating Systems Principles (SOSO'01), available at the online catalog of the Library of Congress, accessed Jul. 31, 2017.
Bibliographic Record Information for Operating Systems Review—Proceedings of the 18th ACM Symposium on Operating Systems Principles (SOSO'01), available at the online catalog of the Library of Congress, accessed Jul. 31, 2017.
Scans of Issue, Operating Systems Review—Proceedings of the 18th ACM Symposium on Operating Systems Principles (SOSO'01), vol. 35, No. 5, pp. 202-215, obtained from a CD-ROM from Auburn University.
MARC Record Information for Operating Systems Review—Proceedings of the 18th ACM Symposium on Operating Systems Principles (SOSO'01) CD-ROM, available at the Auburn University Library online catalog, accessed Jul. 28, 2017.
Bibliographic Record information for Operating Systems Review—Proceedings of the 18th ACM Symposium on Operating Systems Principles (SOSO'01) CD-ROM, available at the Auburn University Library online catalog, accessed Jul. 28. 2017.
Scan of CD-ROM and CD-ROM Case, Operating Systems Review—Proceedings of the 18th ACM Symposium on Operating Systems Principles (SOSO'01) CD-ROM obtained from the Auburn University Library.
Byung-Gon Chun, et al., "Efficient Replica Maintenance for Distributed Storage Systems," Proceedings of NSDI '06: 3rd Symposium on Networked Systems Design & Implementation (2006).
Scanned pages of Dabek, F., et al., 2001. "Wide-area cooperative storage with CFS," Operating Systems Review—Proceedings of the 18th ACM Symposium on Operating Systems Principles (SOSO'01), vol. 35, No, 5, pp. 202-215, obtained from a CD-ROM from Auburn University.
Declaration of Ingrid Hsieh-Yee, PhD Under 37 C.F.R. § 1.68.
Declaration of Michele Nelson Under 37 C.F.R. § 1.68.
Declaration of David Bader Under 37 C.F.R. § 1.68.
MARC Record information for the Design and Implementation of the FreeBSD Operating System (2005), available at the online catalog of the Library of Congress, accessed Aug. 3, 2017.
Bibliographic Record Information for the Design and Implementation of the FreeBSD Operating System (2005), available at the online catalog of the Library of Congress, accessed Aug. 3, 2017.
Scanned pages of Marshall Kirk McKusick, et al., The Design and Implementation of the FreeBSD Operating System (2005), obtained from the George Mason University Library.
MARC Record Information for the Design and Implementation of the FreeBSD Operating System (2005), available at the online catalog of the George Mason University Library, accessed Aug. 3, 2017.
Bibliographic Record Information for the Design and Implementation of the FreeBSD Operating System (2005), available at the online catalog of the George Mason University Library; accessed Aug. 3, 2017.
Springpath Inc.'s Preliminary Invalidity Contentions, C.A. No. 4:15-cv-13345-TSH Document 101, filed Mar. 21, 2017 in the US Disctrict Court for the District of Massachusetts and Exhibit A1, listing references cited herein.
Li et al., Secure Untrusted Data Repository (SUNDR), 2004 ("Li")(SPR00000113-PR000000128).
Sandberg et al., Design and implementation of the Sun network filesystem, 1985 ("Sandberg")(SPR00000129-SPR00000140).
Duinlan et al., Venti: A New Approach to Archival Storage, 2002 ("Quinlan")(SPR00000141-SPR00000154).
Best et al., JFS Layout: How the Journaled File System Handles the On-Disk Layout, 2000 ("Best")(SPR00000155-SPR00000197).
Zhu et al, Avoiding the Disk Bottleneck in the Data Domain Deduplication File System, 2008 ("Zhu") (SPR00000198-SPR00000211).
Abd-El-Malek et al., Ursa Minor: Versatile Cluster-Based Storage, 2005 ("Abd-El-Malek")(SPR00000212-SPR00000225).
Bobbarjung et al., Improving Duplicate Elimination in Storage Systems, 2006 ("Bobbarjung")(SPR00000226SPR00000248).
Cox et al., Pastiche: Making Backup Cheap and Easy, 2002 ("Cox")(SPR00000249-SPR00000263).
Dabek et al., Wide-Area Cooperative Storage With CFS, 2001 ("Dabek")(SPR00000264-SPR00000277).
Debnath et al., ChunkStash: Speeding up Inline Storage Deduplication Using Flash Memory, 2010 ("Debnath") (SPR00000278-SPR00000292).
Fu et al., Fast and Secure Distributed Read-Only File System, 2000 ("Fu 2000")(SPR00000293-SPR00000308).
Fu et al., Fast and Secure Distributed Read-Only File System, 2002 ("Fu")(SPR00000309-SPR00000332).
Mesnier et al., Object-Based Storage, 2003 ("Mesnier")(SPR00000333-SPR00000339).
Muthitacharoen et al., Ivy: A Read/Write Peer-to-Peer File System, 2002 ("Muthitacharoen")(SPR00000340-SPR00000353).
Rhea et al., Fast, Inexpensive Content-Addressed Storage in Foundation, 2008 ("Rhea")(SPR00000354-SPR00000367).
Richie et al., The UNIX Time-Sharing System, 1974 ("Richie")(SPR00000368-SPR00000378).
Levanoni et al., An On-the-Fly Reference-Counting Garbage Collector for Java, 2001 ("Levanoni")(SPR00000379- SPR00000445).
Boehm et al., Garbage Collection in an Uncooperative Environment, 1998 ("Boehm")(SPR00000446-SPR00000462).
1003.1™ Standard for Information Technology—Portable Operating System Interface (POSIX®), System Interfaces, Issue 6, 2001 ("POSIX_S1_2001")(SPR00000463-SPRO00000464).
Harel Paz, Efficient Memory Management for Servers, 2006 ("Paz")(SPR00000465-SPR00000692).
Grembowski et al., Comparative Analysis of the Hardware Implementations of Hash Functions SHA-1 and SHA-512, 2002 ("Grembowski")(SPR00000693-SPR00000707).
Chaves et al., Cost-Efficient SHA Hardware Accelerators, 2008 ("Chaves")(SPR00000708-SPR00000717).
Hitz et al., File System Design for an NFS File Server Appliance, 1994 ("Hitz")(SPR00000718-SPR00000740).
Kawaguchi et al., A Flash-Memory Based File System, 1995 ("Kawaguchi")(SPR00000741-SPR00000750).
You et al., Deep Store: An Archival Storage System Architecture, 2005 ("You")(SPR00000751-SPR00000762).
McKusick et al., A fast file system for UNIX, 1984 ("McKusick")(SPR00000763-SPR00000779).
The EMC Centera and TOWER Technology Advantage, 2002 ("Centera")(SPR00000780-SPR00000787).
Hutchinson et al., *Logical* vs. *Physical File System Backup*, 1999 ("Hutchinson")(SPR00001594-1605).
Decision Denying Institution of Inter Partes Review, Case IPR2017-01933, U.S. Pat. No. 8,478,799 B2, Mar. 16, 2018, pp. 1-18, USPTO.

(56) References Cited

OTHER PUBLICATIONS

Defendant Springpath, Inc.'s Motion for Leave to File Supplemental Claim Construction Brief, Case 4:15-cv-13345-TSH, Document 146, Oct. 17, 2017, pp. 1-5.
Defendant Springpath, Inc.'s Preliminary Claim Construction Brief with Exhibits, Case 4:15-cv-13345-TSH, Document 129, Jul. 10, 2017, pp. 1-138.
Defendant Springpath, Inc.'s Reply Claim Construction Brief, Case 4:15-cv-13345-TSH, Document 133, Jul. 24, 2017, pp. 1-17.
Frank Dabek, "A Distributed Hash Table," Sep. 2005, pp. 1-135, Massachusetts Institute of Technology.
Hewlett Packard Enterprise Company's Response to Springpath's Supplemental Claim Construction Brief, C.A. No. 4:15-cv-13345-TSH, Oct. 30, 2017, pp. 1-5.
Joint Claim Construction arid Prehearing Statement, Case 4:15-cv-13345-TSH, Document 136, Aug. 17, 2017, pp. 1-8.
Patent Owner's Preliminary Response Pursuant to 37 CFR 42,107(a), Case IPR2017-01933, U.S. Pat. No. 8,478,799, Dec. 21, 2017, pp. 1-47.
Petitioner's Reply to Patent Owner's Preliminary Response, Case IPR2017-01933, U.S. Pat. No. 8,478,799, Feb. 28, 2018, pp. 1-17.
SimpliVity Corporation's Markman Hearing Transcript, Case No. 15cv13345-TSH, Aug. 16, 2017, pp. 1-119.
Simplivity Corporation's Opening Claim Construction Brief, Case 4:15-cv-13345-TSH, Document 130, Jul. 10, 2017, pp. 1-21.
Simplivity Corporation's Reply Claim Construction Brief, Case 4:15-cv-1334-TSH, Document 132, Jul. 24, 2017, pp. 1-23.
Usenix Association, "Proceedings of the First Symposium on Networked Systems Design and Implementation," Mar. 2004, pp. 1-15, San Francisco, CA, USA.

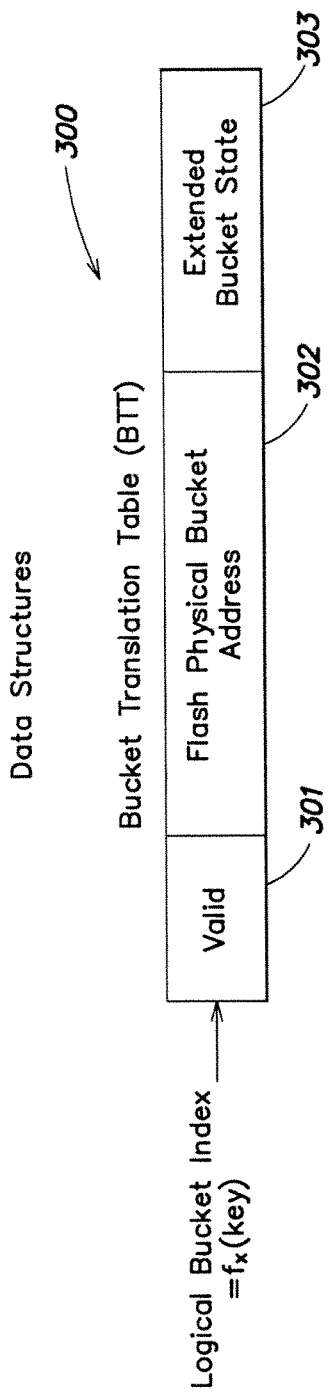
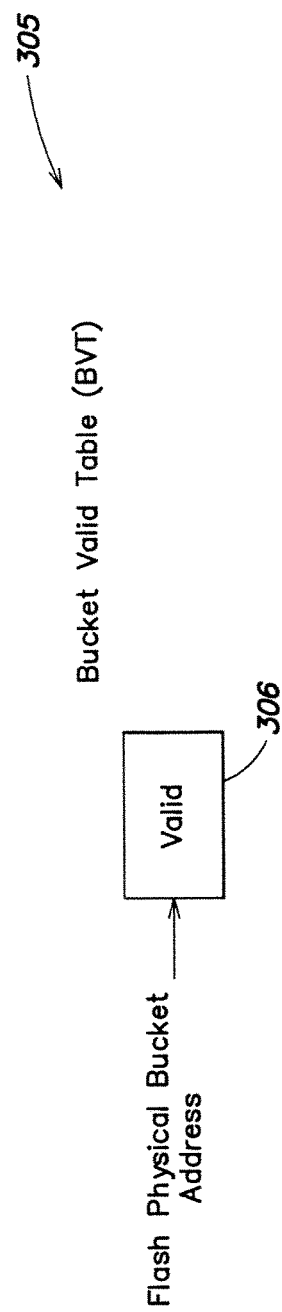
FIG. 2A
FIG. 2B

Displacement Hashing (Cuckoo Hashing)
|   | $H_0(X)$ | $H_1(X)$ |
|---|---|---|
| P | 2 | 5 |
| Q | 1 | 3 |
FIG. 11A
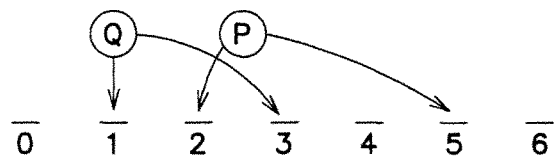
FIG. 11B
FIG. 11C
|   | $H_0(R)$ | $H_1(R)$ |
|---|---|---|
| R | 1 | 2 |
FIG. 11D
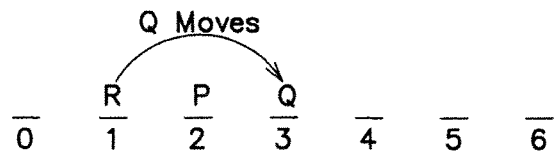
FIG. 11E Device Management

SCALABLE INDEXING

FIELD OF THE INVENTION

The present invention relates to methods and apparatus for the construction of an index that scales to a large number of records and provides a high transaction rate.

BACKGROUND

Some modern file systems use objects to store file data and other internal file system structures ("metadata"). A file is broken up into many small objects, perhaps as small as 4 KB ($2^{12}$ bytes). For a file system that spans 64 TB ($2^{46}$ bytes), for example, this results in over $2^{(46-12)}=2^{34}$, or roughly 16 billion objects to keep track of.

In this context an object is a sequence of binary data and has an object name, often a GUID (globally unique ID), or a cryptographic hash of the content, although other naming conventions are possible as long as each unique object has a unique name. Object names are usually fixed length binary strings intended for use by programs, as opposed to people. Object sizes are arbitrary, but in practice are typically powers of 2 and range from 512 bytes ($2^9$) up to 1 MB ($2^{20}$). Objects in this context should not be confused with objects as used in programming languages such as Java and C++.

An index (sometimes referred to as a dictionary or catalog) of all the objects is needed by the file system. Each record in the index may contain the object name, length, location and other miscellaneous information. The index may have as its primary key the object name, the object's location, or possibly both. A record is on the order of a few tens of bytes, 32 bytes being one example.

Operations on this index include adding an entry, looking up an entry, making modifications to the entry, and deleting an entry. These are all typical operations performed on any index.

Because these file systems work with objects, for the file system to obtain acceptable performance levels, an indexing solution has two challenges not easily met:

1) The number of entries in the index can be very large. In the example listed above, if each index entry is 32 ($2^5$) bytes, then the index takes $2^{(5+34)}=2^{39}$, or 512 GB of memory. This does not fit cost effectively in current memory technologies.
2) The operations against the index are large. A commercially viable storage system may need to perform at, say, 256 MB/sec ($2^{28}$ bytes/second). At 4 KB object sizes, that is $2^{(28-12)}=2^{16}$, or 64 thousand operations per second. Given that file systems typically generate and reference other data (objects) internally, the index operation rate can easily exceed 100 thousand operations/second. As a point of comparison, a current state of the art disk can do at best 400 operations per second.

Achieving the necessary performance and capacity levels is not practical using DRAM memory technology, or disk technology, alone. DRAM memory is fast enough, but not dense enough. Disks have the density, but not the performance. Scaling either (DRAM memory or disks) to reach the desired characteristics is too expensive.

Object names are often uniform in both their distribution and access patterns, so typical caching schemes, which depend on spatial and temporal locality, have limited effect. Thus, the indexing problem is difficult in both size, and in operation rates.

SUMMARY OF THE INVENTION

In accordance with one embodiment of the invention, there is provided a method of accessing an index stored in a non-uniform access memory by a uniform access indexing process, the method comprising:

maintaining a translation table to map a logical bucket identifier generated by the indexing process to a physical bucket location of the memory to access each record data entry in the index;

collecting in cache a plurality of the record data entries, to be written to the index, prior to a subsequent sequential write of the collection of entries to at least one physical bucket location of the memory.

In one embodiment, the method includes:
writing the collection of record data entries from the cache to a bucket location of the memory as a sequential write;
updating the translation table with the bucket location for the record data entries of the collection.

In one embodiment, the method includes:
reading one or more sequential record data entries from the memory to the cache;
designating as free the physical locations in memory from which the one or more entries were read.

In one embodiment, the method includes:
rendering a plurality of sequential physical bucket locations in the memory as a free block by reading any valid entries in the block to the cache and designating as free the physical locations in memory from which such entries were read.

In one embodiment:
the indexing process generates random access requests to the index based on uniformly distributed and unique index keys.

In one embodiment:
the keys comprise cryptographic hash digests.

In one embodiment:
the indexing process comprises a displacement hashing process.

In one embodiment:
the displacement hashing comprises a cuckoo hashing process.

In one embodiment:
the memory comprises one or more of flash, phase-change, and solid state disk memory devices.

In one embodiment:
the memory is limited by one or more of random write access time, random read-modify-write access time, sequential write, alignment restrictions, erase time, erase block boundaries and wear.

In one embodiment:
a size of the physical bucket comprises a minimum write size of the memory.

In one embodiment:
the size of the physical bucket comprises a page or partial page.

In one embodiment:
the memory has an erase block comprising a plurality of pages.

In one embodiment the method includes:
maintaining a bucket valid table for tracking which bucket locations in the memory are valid.

In one embodiment:
a bucket in memory comprises a set of one or more record data entries and a self-index into the bucket translation table.

In one embodiment:
the record data entries in the bucket are not ordered.

In one embodiment the method includes:
designating as read only in cache the record data entries written sequentially to the memory.

In one embodiment:
the bucket translation table is stored in persistent memory.

In one embodiment, the method includes:
tracking the number of free buckets in an erase block and implementing a process to generate a free erase block when a threshold of free buckets is met.

In one embodiment:
the indexing process performs indexing operations based on requests that records be inserted, deleted, looked up and/or modified.

In one embodiment:
the indexing process presents logical bucket operations for reading and writing to physical buckets which store the records of the index.

In one embodiment:
the physical bucket operations include random reads and sequential writes.

In one embodiment:
the physical bucket operations further include trim commands.

In one embodiment:
the memory comprises a physical device layer characterized by non-uniform read and write access and immutability with respect to size, alignment and timing.

In one embodiment:
the record data entry comprises fields for a key, a reference count and a physical block address.

In one embodiment:
the key comprises a cryptographic hash digest of data;
the physical block address field contains a pointer to the physical block address of the data stored on a storage device.

In one embodiment:
the logical bucket locations are generated by a plurality of hash functions.

In one embodiment:
the memory comprises a flash memory device which includes a plurality of erase blocks, each erase block comprises a plurality of pages, and each page comprises a plurality of buckets.

In accordance with another embodiment of the invention, there is provided a computer program product comprising program code means which, when executed by a processor, performs the steps of the foregoing method.

In accordance with another embodiment of the invention, there is provided a
computer-readable medium containing executable program instructions for a method of accessing an index stored in a non-uniform access memory by a uniform access indexing process, the method comprising:
maintaining a translation table to map a logical bucket identifier generated by the indexing process to a physical bucket location of the memory to access each record data entry in the index;
collecting in cache a plurality of the record data entries, to be written to the index, prior to a subsequent sequential write of the collection of entries to at least one physical bucket location of the memory.

In accordance with another embodiment of the invention, there is provided a system comprising:
physical processor and memory devices including a computer-readable medium containing executable program instructions for a method of accessing an index stored in a non-uniform access memory by a uniform access indexing process, the method comprising:
maintaining a translation table to map a logical bucket identifier generated by the indexing process to a physical bucket location of the memory to access each record data entry in the index;
collecting in cache a plurality of the record data entries, to be written to the index, prior to a subsequent sequential write of the collection of entries to at least one physical bucket location of the memory.

In one embodiment:
the memory that stores the index comprises a physical device layer characterized by non-uniform read and write access and immutability with respect to size, alignment and timing.

In one embodiment:
the memory that stores the index comprises one or more of flash, phase-change and solid state disk memory devices.

In one embodiment:
the memory that stores the index comprises a flash memory device which includes a plurality of erase blocks, each erase block comprises a plurality of pages, and each page comprises a plurality of buckets.

In accordance with another embodiment of the invention, there is provided a
method of accessing an index stored in a non-uniform access memory by a uniform access indexing process, the method comprising:
providing to a translation table, which maps a logical bucket identifier to a physical bucket location of the memory for each record data entry in the index, logical bucket identifiers generated by the indexing process;
accessing physical bucket locations mapped to the logical bucket identifiers;
collecting in a cache record data entries to be written to the index;
subsequently writing sequentially a collection of the record data entries from the cache to the index in at least one new physical bucket location of the memory; and
updating the translation table to associate the at least one new physical bucket location with a logical bucket identifier.

In accordance with another embodiment of the invention, there is provided a computer system comprising:
a non-uniform access memory in which is stored an index comprising record data entries in physical bucket locations of the memory;
a translation table to map a logical bucket identifier generated by a uniform access indexing process to a physical bucket location of the memory for each of the record data entries;
a cache for collected record data entries to be written to an index;
means for accessing physical bucket locations of the memory mapped to logical bucket identifiers supplied to the translation table by the indexing process;
means for writing sequentially a collection of the record data entries from the cache to the index at least one physical bucket location of the memory; and
means for updating the translation table to associate the at least one physical bucket location with a logical bucket identifier.

BRIEF DESCRIPTION OF THE DRAWINGS

The invention will be more fully understood by reference to the detailed description, in conjunction with the following figures:

FIGS. 2A through 2D illustrate various embodiments of data structures which may be used in the present invention;

FIGS. 11A-11E illustrate schematically an implementation of cuckoo hashing according to one embodiment of the invention;

DETAILED DESCRIPTION

A. Overview

Figure 1:
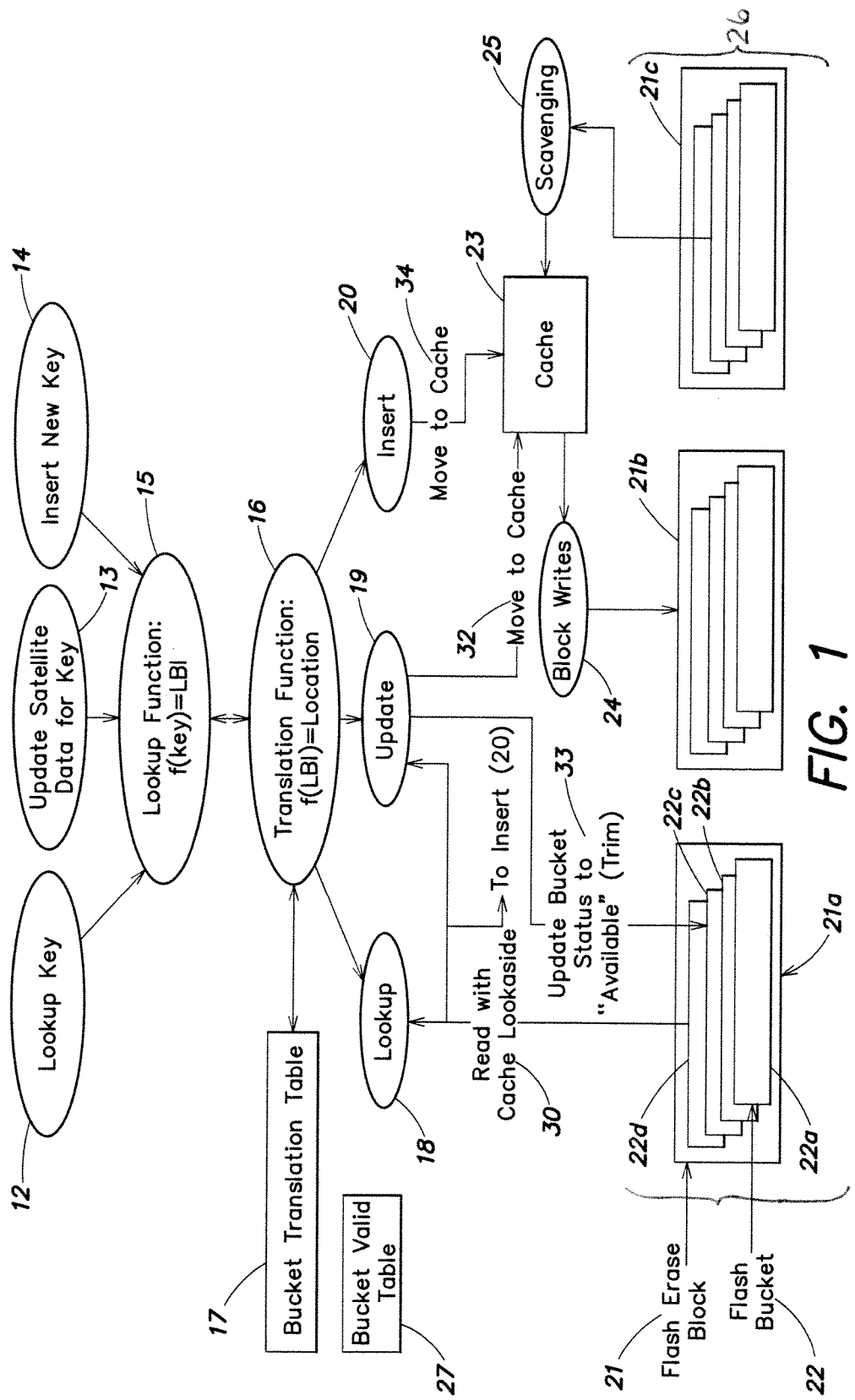
FIG. 1 is a schematic block diagram illustrating various indexing operations performed in accordance with one embodiment of the present invention.

According to one or more embodiments of the invention, specialized memory technology and algorithms are used to build indices that simultaneously have large numbers of records and transaction requirements. One embodiment utilizes a displacement hashing indexing algorithm, for example cuckoo hashing. The invention enables use of non-uniform access memory technologies such as flash, phase-change and solid state disk (SSD) memory devices.

In various embodiments of the invention, new data structures and methods are provided to insure that an indexing algorithm performs in a way that is natural (efficient) to the algorithm, while the memory device sees IO (input/output) patterns that are efficient for the memory device.

One data structure, an indirection table, is created that maps logical buckets as viewed by the indexing algorithm to physical buckets on the memory device. This mapping is such that write performance to non-uniform access memory devices is enhanced.

Another data structure, an associative cache, is used to collect buckets and write them out sequentially to the memory device, as part of the cache's eviction and write-back policies.

Methods are used to populate the cache with buckets (of records) that are required by the indexing algorithm. Additional buckets may be read from the memory device to cache during a demand read, or by a scavenging process.

Use of the cache, in conjunction with the indirection table, allows large sequential writes to the memory device.

While flash technology has the fundamental capability of achieving the needed capacity and IO rates for the indexing problem, flash access characteristics are non-uniform. This non-uniformity is significant enough that normal indexing algorithms work poorly, if at all, with a flash memory device.

The non-uniform access flash memory that is used in the present invention is an electrically-erasable programmable read-only memory (EEPROM) that must be read, written to and erased in large block sizes of hundreds to thousands of bits, i.e., no. byte level random access. Physically, flash is a non-volatile memory form that stores information in an array of memory cells made from floating-gate transistors. There are two types of flash memory devices, NAND flash and NOR flash. NAND flash provides higher density and large capacity at lower cost, with faster erase, sequential write and sequential read speeds, than NOR flash. As used in this application and in the present invention, "flash" memory is meant to cover NAND flash memory and not NOR memory. NAND includes both single-level cell (SLC) devices, wherein each cell stores only one bit of information, and newer multi-level cell (MLC) devices, which can store more than one bit per cell. While NAND flash provides fast access times, it is not as fast as volatile DRAM memory used as main memory in PCs. A flash memory device may or may not include a flash file system. Flash file systems are typically used with embedded flash memories that do not have a built-in controller to perform wear leveling and error correction.

A typical NAND flash chip may store several GB of content. Unlike memory attached to a computer, the memory on the flash chip must be accessed in certain sizes and on certain boundaries. Furthermore, once a section of memory has been written, an erase operation must be performed before those memory locations can be written to again. Also, locations wear out, so insuring that all locations get a similar number of writes further complicates the usage. Read times, write times, and erase times can vary significantly (from micro seconds to milliseconds). Thus the timing, wear leveling and alignment restrictions make the practical use of flash difficult at best.

A flash memory device may contain one or more die (silicon wafers). Each die, for the most part, can be accessed independently.

A die is composed of thousands of erase blocks. An erase block is typically 128-512 KB in size. When data needs to be cleared, it must be cleared on erase block boundaries.

Another limitation of NAND flash is that data can only be written sequentially. Furthermore, the set up time for a write is long, approximately 10× that of a read.

Data is read on page granularity. A page may range from 1 KB to 4 KB depending on the particular flash chip. Associated with each page are a few bytes that can be used for error correcting code (ECC) checksum.

Data is written on page granularity. Once written, the page may not be written again until its erase block (containing the page) is erased. An erase block may contain several dozen to over 100 pages.

One exception to the above read and write page granularity are sub-page writes, or partial page programming.

Depending on the technology, pages may be partially written up to 4 times before an erasure is required.

Since pages in a NAND flash block may be written sequentially and only once between block erase operations, subsequent writes require a write to a different page, typically located in a different flash block. The issue of block erases is handled by creating a pool of writeable flash blocks, a function of the flash file system.

Erasing an erasure block is the most expensive operation time-wise, as it can take several milliseconds. For devices that are heavily used (traffic-wise), the speed at which erase blocks can be generated (i.e. how fast free erase blocks can be made available) is often a limiting factor in flash design.

Many SSD (Solid State Disks) use flash technology. The firmware in the SSD handles the aforementioned access issues in a layer called the Flash Translation Layer (FTL). In doing so, however, the firmware makes assumptions about how the SSD will be used (e.g., mostly reads, mostly writes, size and alignment of reads and writes), and as a result of these assumptions, the SSD's performance characteristics are often sub-optimal for indexing algorithms.

Many indexing algorithms that one finds in the literature and in practice are based on a uniform memory access model, i.e. all memory is equally accessible time-wise for both reads and writes, and there are not any first order restrictions on access size or alignment.

If one considers an indexing solution, operations such as insert, delete, lookup and modify typically require more and varied amounts of time, and reads and writes of blocks, typically small blocks (4 KB or so), less time. The blocks appear to be random, i.e., any block may be read, and any other block may be written. With some algorithms, there are random read-modify-write IO profiles, i.e. a random block is read, and then written back to the same location with slightly modified data.

This random IO that an indexing algorithm needs to operate efficiently, is not what flash is intended to provide. While flash can handle random reads well, random writes are difficult, as are read-modify-writes. The reason for this is that one cannot over-write something that has already been written, one has to erase it first. To further complicate the situation, erasing takes time, and must happen on large boundaries (typical 64 KB).

When an erase block is erased, any valid data in that block needs to be moved elsewhere. If the algorithm writes random 4 KB blocks across the flash device, a naïve implementation would result in blocks being erased all the time. As erase times are slow, the performance would suffer significantly.

In accordance with the invention, to allow writes to the flash to be sequential, while still preserving the logical random access that the indexing algorithm expects, a translation or indirection table is created. This table maps logical buckets (of records) as needed by the indexing algorithm to physical buckets (e.g., pages) of the flash device.

As the indexing algorithm reads in buckets (e.g., pages of data from flash), in order to modify the bucket contents (insert, update or delete operations), the buckets are moved to a cache. The corresponding buckets on the flash device can now be marked as not valid (free). In the case of an SSD, this can take the form of a TRIM command.

According to further embodiments of the invention, methods are provided to generate free erase blocks. At any given time, an erase block may have a combination of valid and invalid data. To free up an erase block, all valid data must be moved off that block. There are two mechanisms that can be used to accomplish this. One is to use the random reads generated by the indexing algorithm to read more (than is required by the indexing algorithm) so as to free up an erase block. As the indexing algorithm tends to generate random reads, over time all erase blocks are eventually read and harvested for empty pages. For example, if the erase block containing the read has some free pages, and some valid pages, then the algorithm may choose to read in the entire erase block and place all valid pages into the cache. This has the effect of freeing up that erase block for a subsequent erase and then write.

Alternatively, e.g., if the aforementioned random read process is not fast enough, a separate scavenging process (e.g., thread) can be used to read erase blocks, and place the valid pages into the cache for coalescing into another erase block.

As the cache fills up, entries must be written out. A set of cache entries is collected that will be sequentially written to a contiguous set of partial pages (if partial page writes are allowed by the flash device), multiple pages, and/or one or more erase blocks. As cache entries are written to the flash device, the indirection table is updated, so that the indexing algorithm still sees the entries as being at a fixed logical address.

B. Indexing Operations

Various embodiments of the invention will now be described utilizing the accompanying FIGS. 1-6 to illustrate various indexing operations performed in accordance with the present invention. FIGS. 7-8 illustrate two methods of generating free erase blocks for efficient utilization of the storage medium (e.g., flash memory). These embodiments are meant to be illustrative and not limiting.

FIG. 1 is an overview of several indexing operations that utilize a bucket translation table 17 and cache 23 according to one embodiment of the invention. At the top of FIG. 1, three index operations 12-14 are shown as alternative inputs to a lookup function 15 and a translation function 16. A first index operation 12 is "lookup key" for returning satellite data from (a record entry) for the key. A second index operation 13 is "update satellite data for key" for updating (modifying) the record entry for the key. A third index operation 14 is "insert new key" for inserting a new record entry. Another index operation, delete, is not shown in FIG. 1 but described below in regard to FIG. 5.

All three index operations first perform a lookup function 15, wherein some function of the key f(key) is used to generate an index identifier, here a logical bucket identifier (LBI) that supports (e.g., speeds up) a hash table lookup. The logical bucket identifier (LBI) is input to a translation function 16 wherein some function of the logical bucket identifier f(LBI) generates a physical bucket location in the flash memory. The translation function is implemented by a bucket translation table 17, which is a map of the logical bucket identifier (as provided by the indexing algorithm) to a target flash memory location (physical bucket location in flash). A dictionary (index) stored in flash memory 26 may comprise records that map a lookup key (e.g., object name) to satellite data (e.g., location pointer to the object stored on disk). The flash memory 26 (see FIG. 1) includes a plurality of flash erase blocks 21 (e.g., 21a, 21b, 21c) each erase block containing plural flash briskets 22 (e.g., 22a, 22b, 22c, 22d).

Next, depending upon which of the three indexing operations is being performed (lookup, update or insert) one or more of the steps shown on the bottom half of FIG. 1 are performed.

For a lookup operation 18, the bucket entry identified by the translation function is read 30 from the target bucket 22 in flash memory, with a cache lookaside (e.g., if the target bucket is stored in cache, it may be read from cache 23 rather than from flash memory 26).

For an update operation 19, the bucket entry identified by the translation function (the original bucket entry) is read 30 from a target bucket 22 in erase block 21a of flash memory (or cache), the bucket is updated and moved 32 to cache, and in a subsequent write 24 a plurality of cache bucket entries are read sequentially to a contiguous set of partial pages, multiple pages and/or erase blocks (e.g. a new erase block 21b) in flash memory. The process updates 33 the status of all the moved buckets in flash to not valid data (e.g., free or available for a trim operation).

For an insert operation 20, a target bucket is again read from flash and a modified bucket entry is moved 34 to cache, again for a subsequent sequential write 24 to a new location in flash memory.

FIG. 1 shows schematically a cache 23 for collecting a plurality of bucket entries, prior to performing a sequential write 24 of the collection of cache bucket entries to contiguous flash memory buckets. In one embodiment, a scavenging operation 25 is used for creating free erase blocks; the process includes storing any valid buckets (from the erase block) in cache during the scavenging process and reallocating the flash erase block as free.

Following a discussion of the new data structures illustrated in FIG. 2, the indexing operations referenced in FIG. 1 will be more specifically described with respect to the flow diagrams of FIGS. 3-6.

C. Data Structures

FIG. 2 illustrates various embodiments of data structures useful in the present invention. Such data structures are meant to be illustrative and not limiting.

FIG. 2a illustrates one embodiment of a bucket translation table (BTT) 300 for translating a logical bucket index (generated by the indexing algorithm) to a physical flash bucket address. A BTT table entry is shown having three fields: valid 301; flash physical bucket address 302; and extended bucket state 303. The bucket address granularity is the minimum write size of the flash device, namely either a partial page write (e.g., for SLC NAND) or a page write (e.g., for MLC NAND). The BTT is 1:1 mapping of logical to physical bucket entries. The table enables reorganization of the flash bucket assignments for higher random performance (random reads and random writes by the indexing algorithm). Additional state information may be added to the BTT in the third field to enable algorithm acceleration.

FIG. 2b shows one embodiment of a bucket valid table (BVT) 305. This table tracks which physical buckets in flash are valid in order to manage the scavenging of buckets into blocks for trimming. As one example, a field 306 labeled valid may be a compact bit array (1 bit/bucket). The size of the BVT is the total number of flash bucket entries, only a subset of which are in use by the BTT.

Figure 2C:
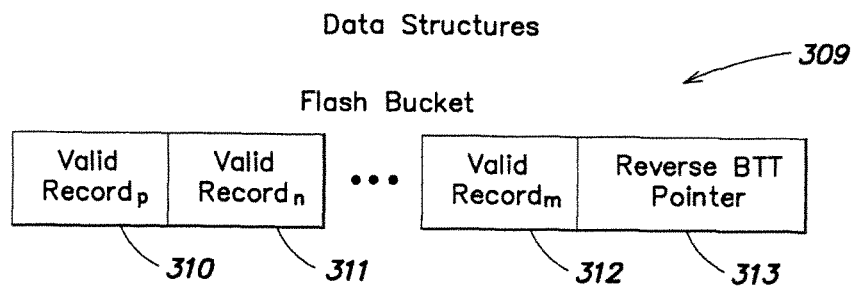

FIG. 2c illustrates one embodiment of flash bucket 309 having multiple records 310, 311, 312 . . . included in the bucket, along with a reverse BTT pointer 313 (a self-index into the bucket translation table 17). Thus, each bucket contains a set of one or more records and a reverse pointer for updating the BTT when flash buckets (e.g., pages) are inserted, moved or deleted. Each element of the bucket (record or pointer) may have redundant content added, such as additional ECC bits, to improve the individual reliability of the data structures and significantly increase the useful life of the storage devices. For example, an optional sequence number field may be added to flash bucket 309 for performing data consistency checking during power fail events; other optimization flags may be provided as well.

Because the record size is small relative to the bucket size, this provides an opportunity (optional) to implement additional error recovery information on an individual record basis. This optional feature would improve the overall reliability of the solution by increasing the number of bit errors and faults which may be corrected and thus increase the effective operating lifetime of the underlying storage technology.

Figure 2D:
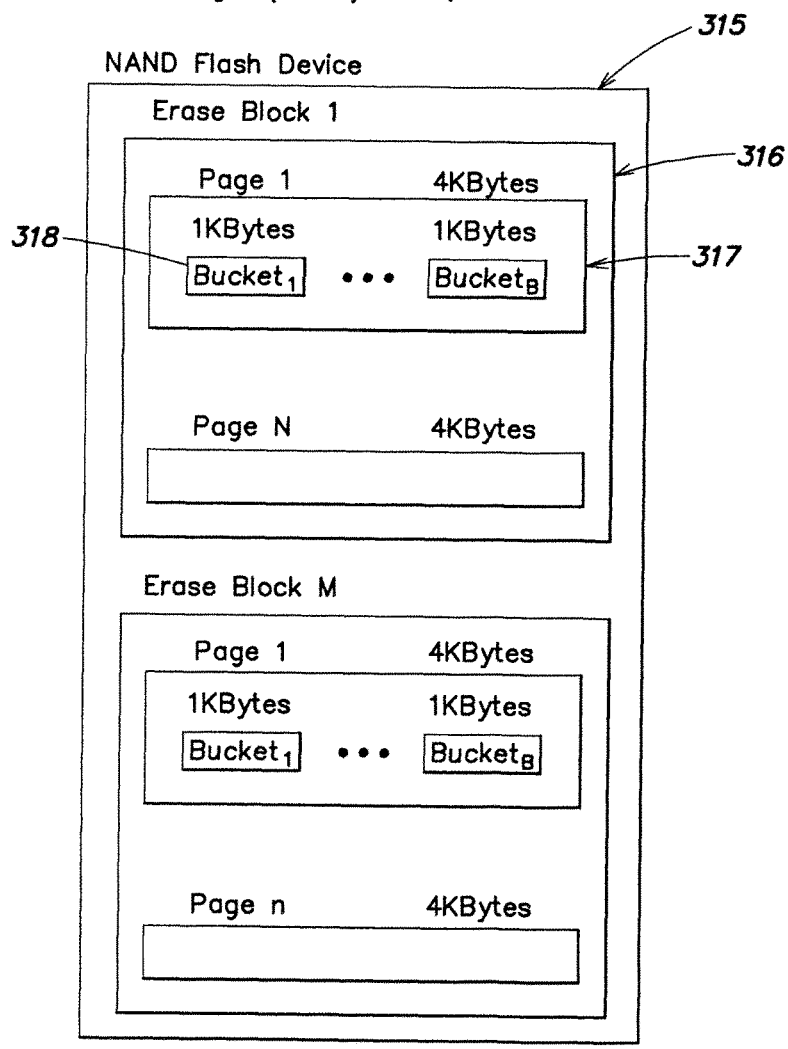

FIG. 2d shows one example of a SLC NAND flash device 315 containing multiple erase blocks 316 (1 to M). Each erase block includes multiple pages 317 (1 to N). In this example, each page is 4 KB and each page includes multiple buckets 318 (1 to B), each bucket being 1 KB. In this example, the device supports partial page writes.

A bucket represents a minimum write size of the flash device. Typically, a bucket would be a page. If partial page writes are allowed, then one or more buckets per flash page may be provided, such as a four partial page SLC NAND device supporting four buckets per page.

Multiple flash pages are provided per erase block. There are multiple erase blocks per flash devices, and each block is individually erased.

The typical flash subsystem consists of multiple flash devices. NAND flash devices are written sequentially once per page (or partial page) within a given block between erase operations, with multiple blocks available for writing and reading simultaneously.

D. Process Flow Charts

Figure 3:
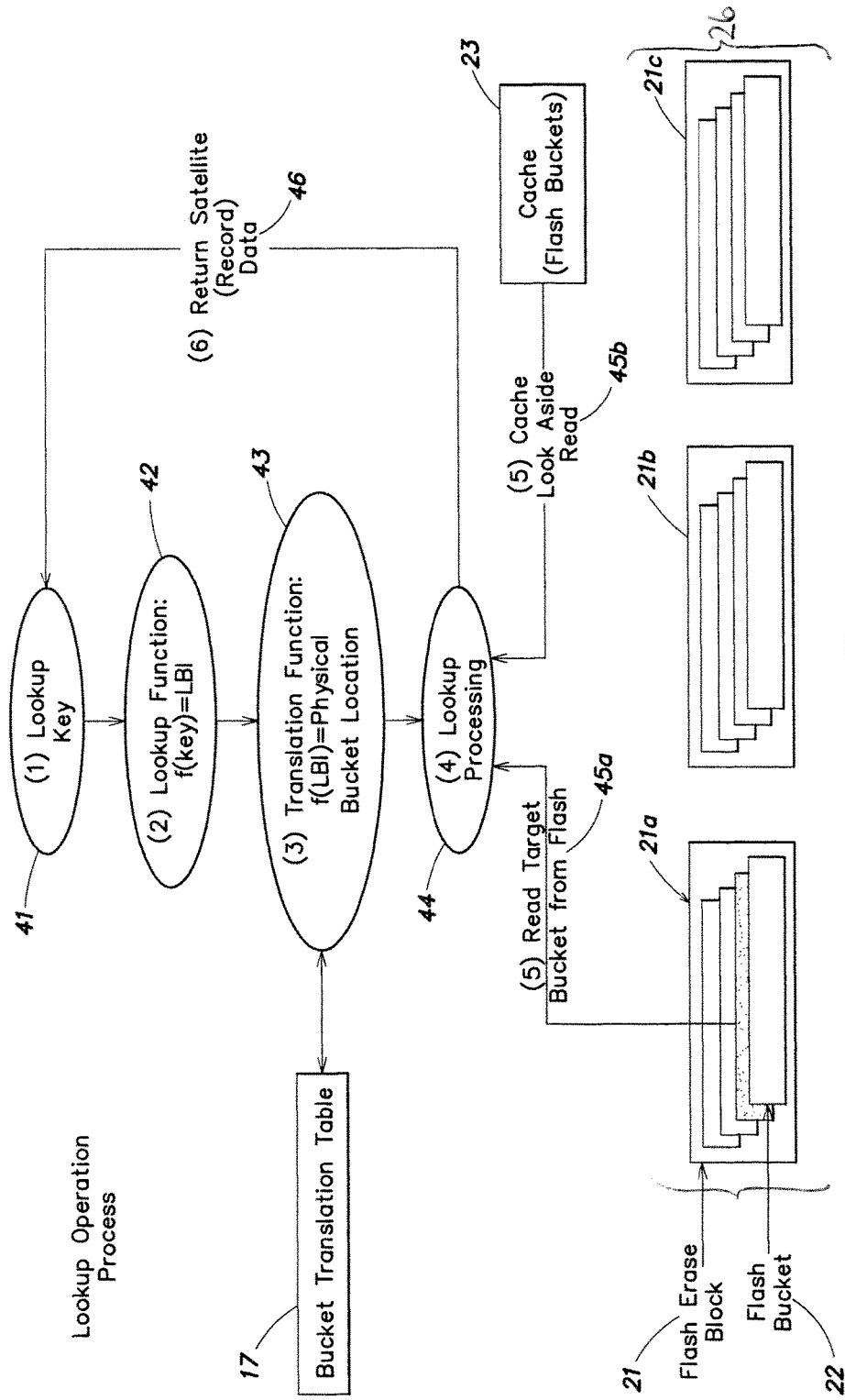
FIG. 3 is a schematic block diagram illustrating a lookup operation according to one embodiment of the invention.

FIG. 3 illustrates one embodiment of a lookup operation process for verifying the presence of a key and returning associated satellite data. In step one 41, a lookup key is input to a lookup function. In step two 42, the lookup function f(key) generates a logical bucket identifier that supports (e.g., speeds up) a hash table lookup. The logical bucket identifier is input to a translation function, which in step three 43 is mapped to a flash memory (physical bucket) location, via the bucket translation table (BTT) 17. In step four 44, the target bucket in flash memory is read 45a from flash memory, unless the bucket is stored in cache, in which case it can be read 45b from cache 23. In step six 46, the satellite (record) data for the key is returned to the indexing algorithm.

Figure 4:
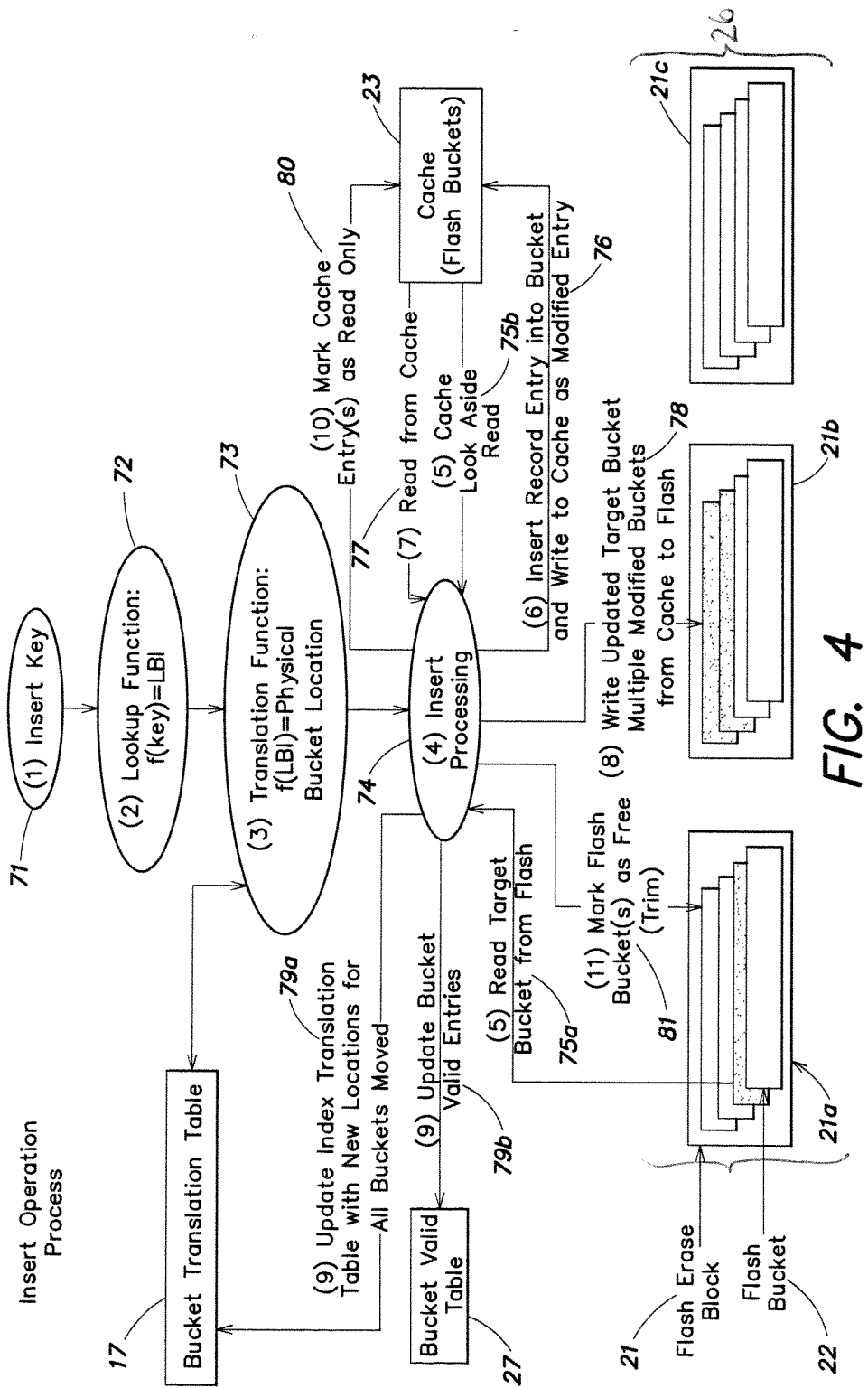
FIG. 4 is a schematic block diagram illustrating an insert operation according to one embodiment of the invention.

FIG. 4 shows one embodiment of an insert operation process. A first step 71 inputs a key to the lookup function. In step two 72, the lookup function f(key) generates an index, here a logical bucket identifier. In step three 73, the bucket identifier is input to a translation function which maps the bucket identifier to a flash memory physical bucket location where the insert should occur, utilizing the bucket translation table (BTT) 17. In step four 74, the insert process receives the target bucket location from the translation function. In step five, the insert process reads the target bucket 22 from an erase block 21a of flash memory 75a, or from cache 75b. In step six 76, the insert process inserts the record entry into the target bucket and writes the modified bucket to cache. In step seven 77, multiple bucket entries (including the modified target bucket) are read from cache 73 by the insert process. In step eight 78, the insert process writes the modified target bucket and other buckets read from cache to new locations (pages in erase block 21b) in flash 26. In step nine, the insert process updates the bucket translation table 17 with the new locations for all buckets moved from cache to flash 79a, and also updates the bucket valid entries in BVT 79b for all buckets moved. In step ten 80, the insert process marks the moved cache entries read only (available). In step eleven 81, the insert process marks the original flash buckets (now moved to a new erase block) as free.

Figure 5:
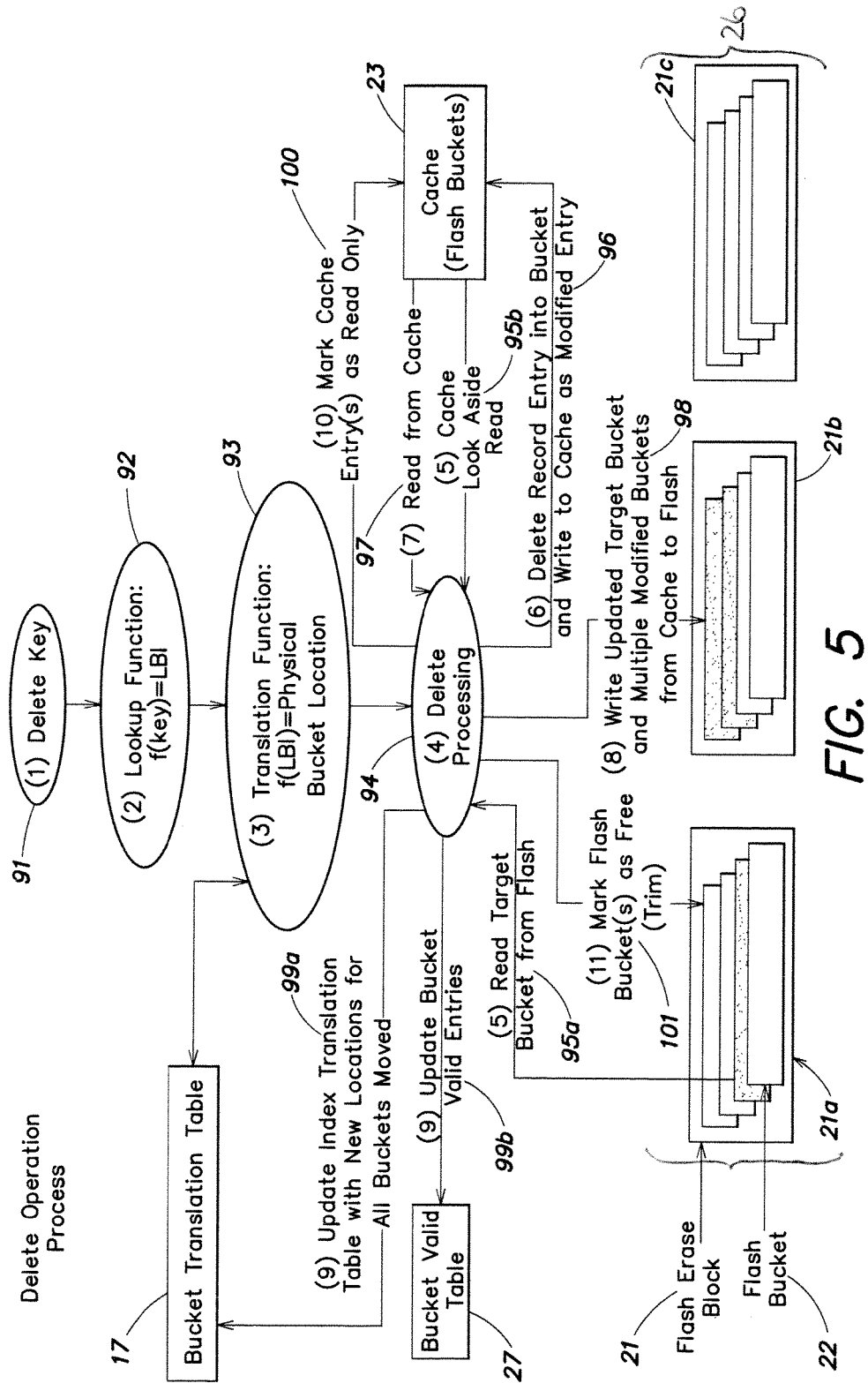
FIG. 5 is a schematic block diagram of a delete operation according to one embodiment of the invention.

FIG. 5 illustrates one embodiment of a delete operation process. In a first step 91, a key is provided to a lookup function. In step two 92, the lookup function f(key) generates an index, here a logical bucket identifier. In step three 93, the bucket identifier is provided to the translation function, which utilizes the bucket translation table 17 to map the bucket identifier to a physical flash memory bucket location. In step four 94, the delete process receives the flash memory location. In step five, the target bucket is read from flash 95a or from cache 95b. In step six 96, the process deletes the original record entry in the bucket and writes the modified bucket (with the deleted entry) to cache 23. In step seven 97, a group (collection) of buckets are read from cache. In step eight 98, the updated target bucket and other buckets read from cache 23 are written sequentially to a contiguous set of free pages in flash. In step nine, the delete process updates the bucket translation table with the new locations in flash for all moved buckets 99a, and updates their valid status in the BVT 99b. In step ten 100, the delete process marks the cache entries as read only. In step eleven 101, the delete process marks the original flash buckets now moved to a new location in flash as free.

Figure 6:
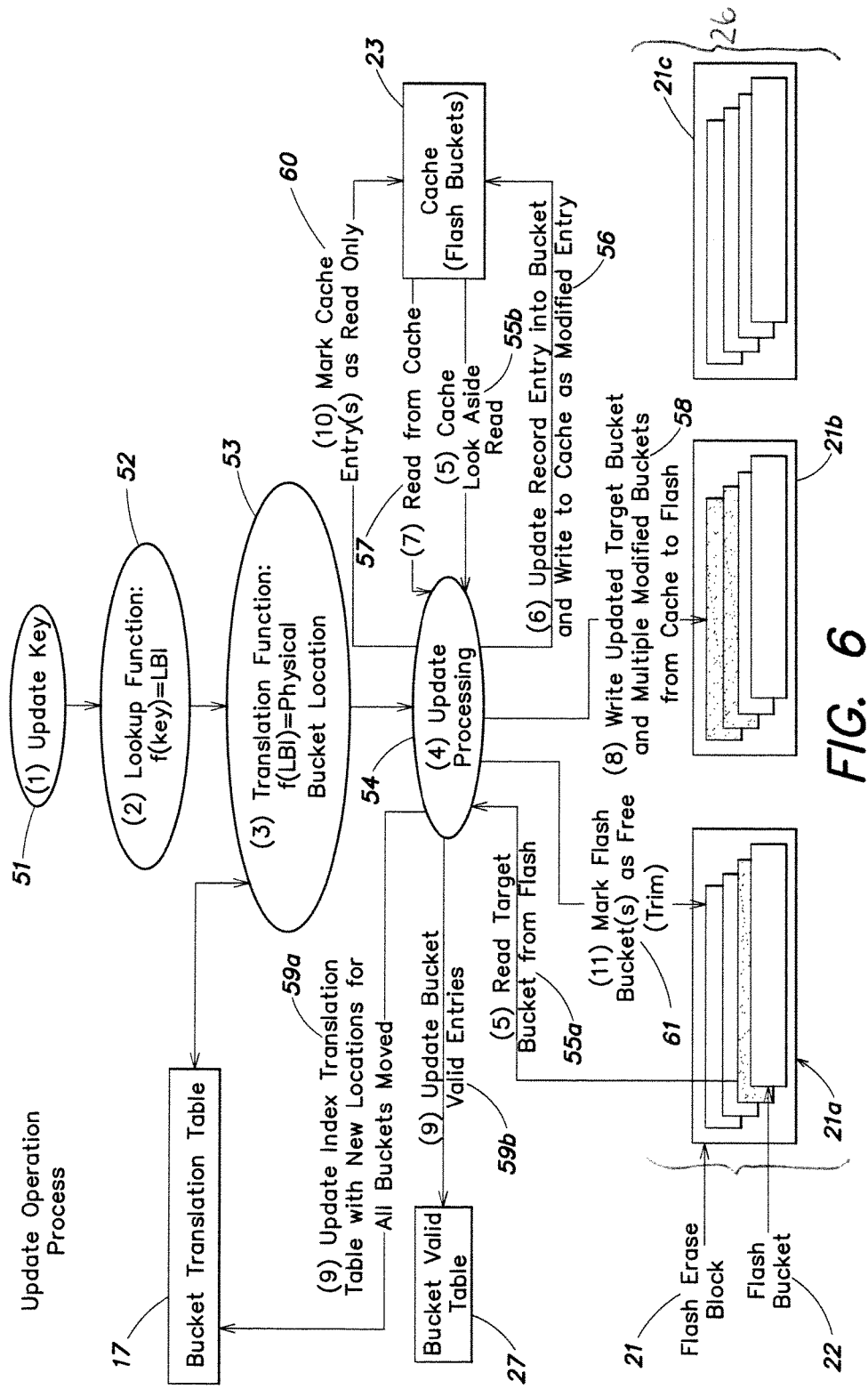
FIG. 6 is a schematic block diagram of an update operation according to one embodiment of the invention.

FIG. 6 illustrates one embodiment of an update operation process for modifying a record in an index stored in flash memory. In a first step 51, a key is provided as input to a lookup function. In step two 52, the lookup function f(key) generates an index, here a logical bucket identifier. The bucket identifier is input to a translation function. In step three 53, the translation function maps the bucket identifier to a physical bucket in flash memory where the update should occur, utilizing the bucket translation table 17, and the process proceeds to step four 54, update processing. In step five 55, the target bucket is read from flash 55a or from cache 55b. In step six 56, after updating the entry, the updated bucket is written to cache 23. In step seven 57, a group of buckets are read from the cache 23 and in a step eight 58, written sequentially from cache to a new location in flash memory 26. In step nine 59, the update process updates the bucket translation table 17 with the new locations for all buckets moved 59a, and updates their valid status in the BVT 59b. In step ten 60, the update process marks the moved entries as read only in cache 23 (and thus available to be written over). Finally, in step eleven 61, the update process marks the original flash buckets, now moved to a new location, as free (available).

Figure 7A:
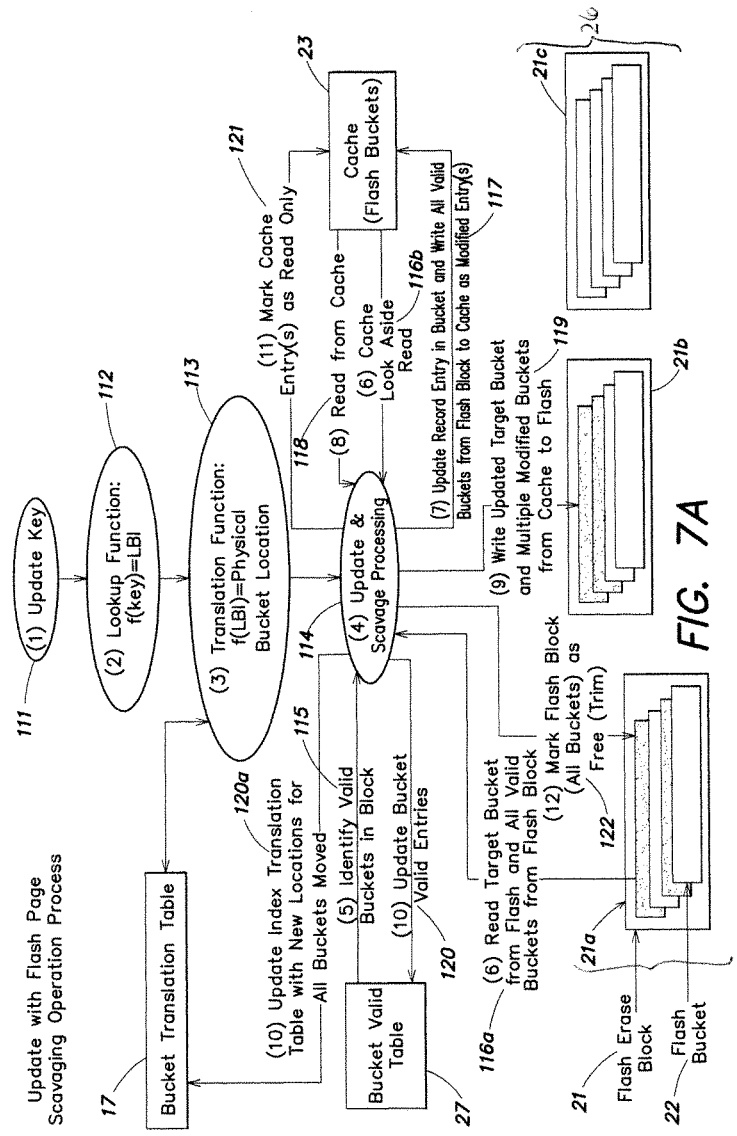
FIGS. 7A and 7B are schematic block diagrams illustrating a random read process for generating free erase blocks according to one embodiment of the invention.

FIG. 7A illustrates one embodiment of a process for generating free erasure blocks, where a demand read (generated by an upstream indexing operation such as a lookup, insert or modify) reads additional buckets in the same erase block (as the target bucket). In FIG. 7A, the process is illustrated with an update request. In step one 111, a key is provided to a lookup function. In step two 112, the lookup function f(key) generates an index identifier, here a logical bucket identifier. In step three 113, the bucket identifier is mapped to a physical target bucket location in flash. In step four 114, the update and scavenge process receives the target flash memory location. In step five 115, the process identifies all valid buckets in the same erase block as the target bucket. In step six, 116a, the update process reads the target bucket and all identified valid buckets from the flash block containing the target bucket (alternatively read from cache, step 116b). In step seven 117, the process updates the record entry in the target bucket and writes all valid buckets from the flash block to cache 23. In step eight 118, the update process reads a group of blocks from cache. In step nine 119, the update process writes the updated target bucket and other buckets read from cache 23 to flash 26. In step ten 120, the update process updates the bucket translation table 17 with the new locations for all buckets moved (written from cache to new erasure block 21b in flash) 120a, and updates the bucket entries in the BVT 120b. In step eleven 121, the update process marks the now stale cache entries as read only. In step twelve 122, the update process marks the original flash block (all buckets in the target block) as free.

Figure 7B:
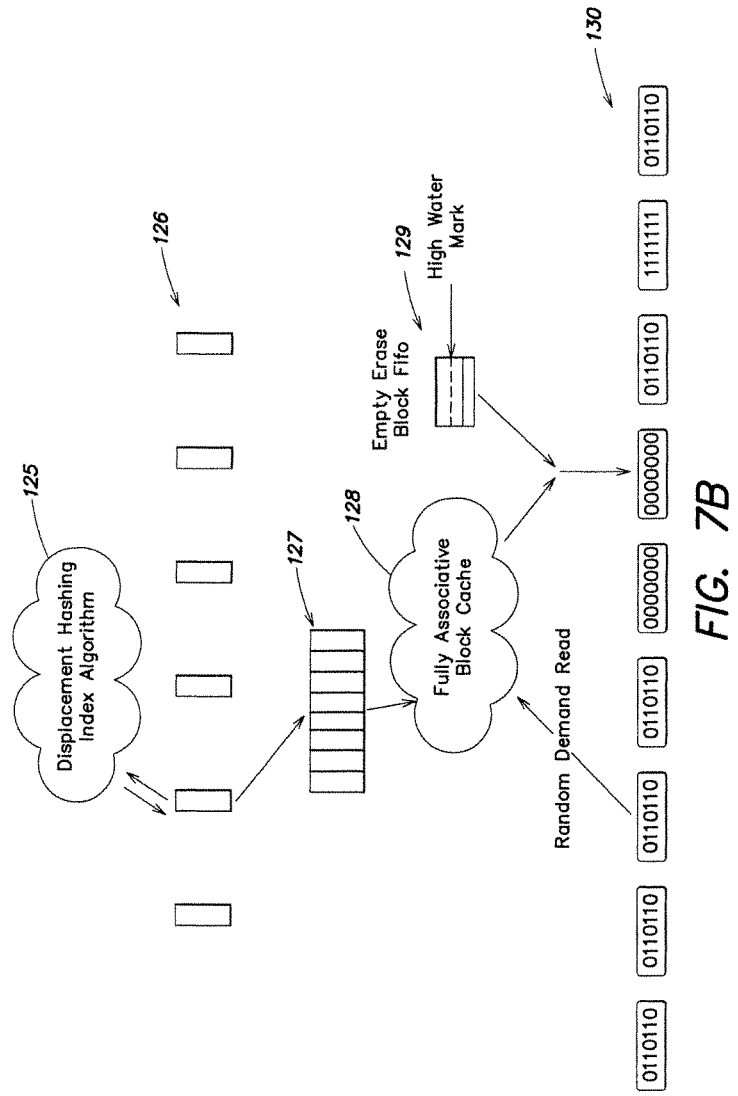

FIG. 7B illustrates a particular embodiment of the random read process just described for generating free erase blocks.

In this embodiment, a displacement hashing indexing algorithm 125 generates logical buckets 126. The logical bucket size as viewed by the indexing algorithm, is tied to the flash erase block size so as to render compatible the indexing algorithm and flash memory. These buckets will be randomly read as a result of index reads and updates.

A bucket translation (indirection) table 127 translates a logical bucket index into a physical flash device bucket location. This indirection table enables the indexing algorithm to work randomly, for reads, writes and updates, and yet have large sequential writes performed at the flash device level. Preferably, the indirection table is stored in persistent memory, but it can be rebuilt as necessary if stored in volatile memory.

The output of the indirection table, namely the physical device bucket location, is provided as input to a fully associative bucket cache 128. In this embodiment, if, the contents of an empty erase block fifo 129 is below a high water mark Q, then the entire erase block (containing the target 4 KB bucket) is read.

The erase blocks host logical buckets, a typical configuration being one erase block holding 16 of the 4 KB logical buckets. The physical device is configured for a load, e.g., 90%, meaning that 90% of the buckets are in use. Caching and victimization (eviction) are used to pack (concentrate) logical buckets in the flash memory so that most of the 10% of the remaining buckets are concentrated in free erase blocks.

The cache victimization (eviction process) takes 16 buckets, collected in cache, and writes out the 16 buckets from cache to a free erase block 130. Because the erase blocks are touched randomly by the random read operations, the read operations can be used to generate free erase blocks. Use of a cryptographic hash function for generating the logical bucket identifiers, will increase the random nature of the read operations and thus improve the random read generation of free erase blocks.

Figure 8A:
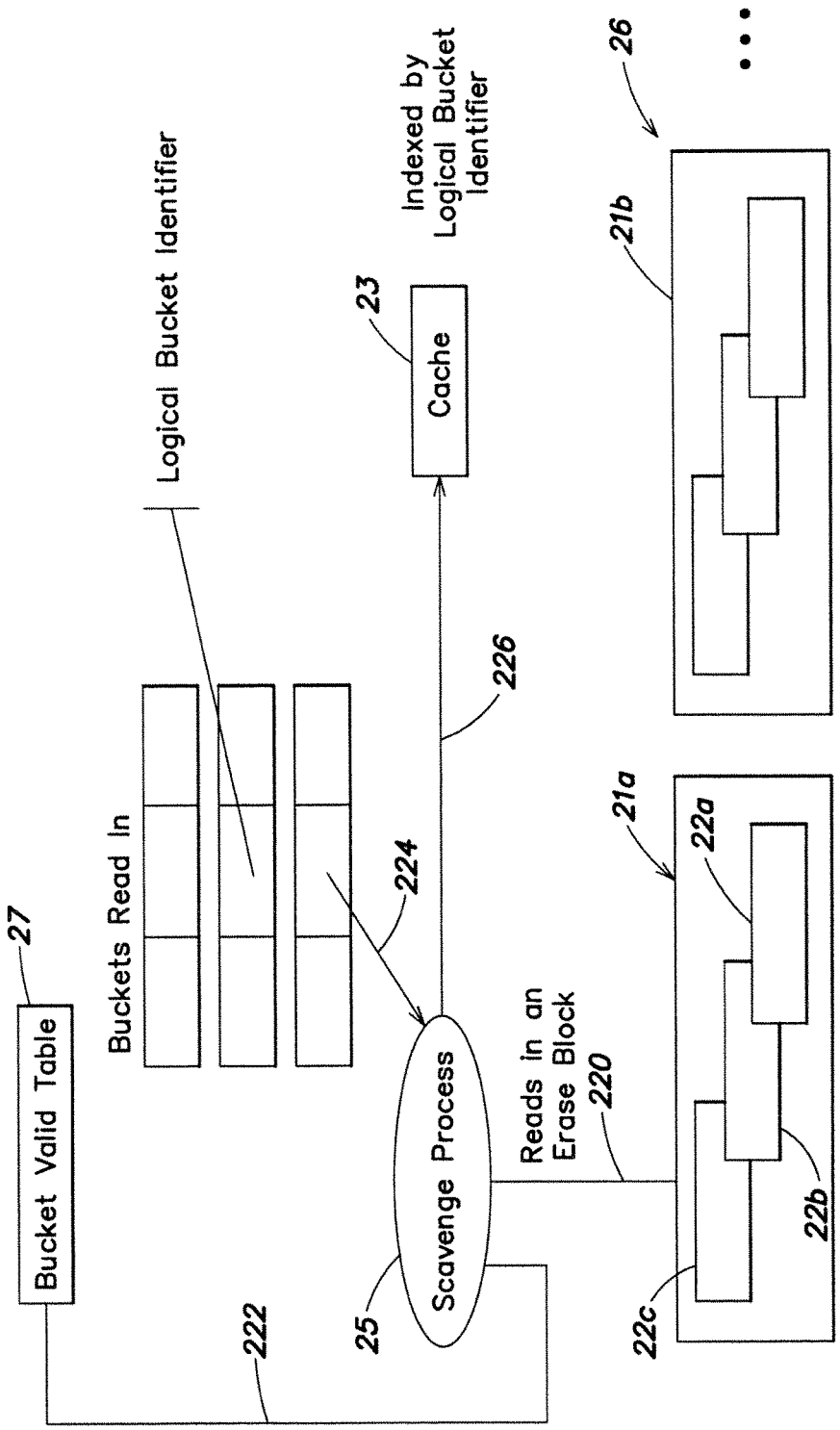
FIGS. 8A and 8B are schematic block diagrams illustrating another method of generating free erase blocks according to a scavenging process.
Figure 8B:
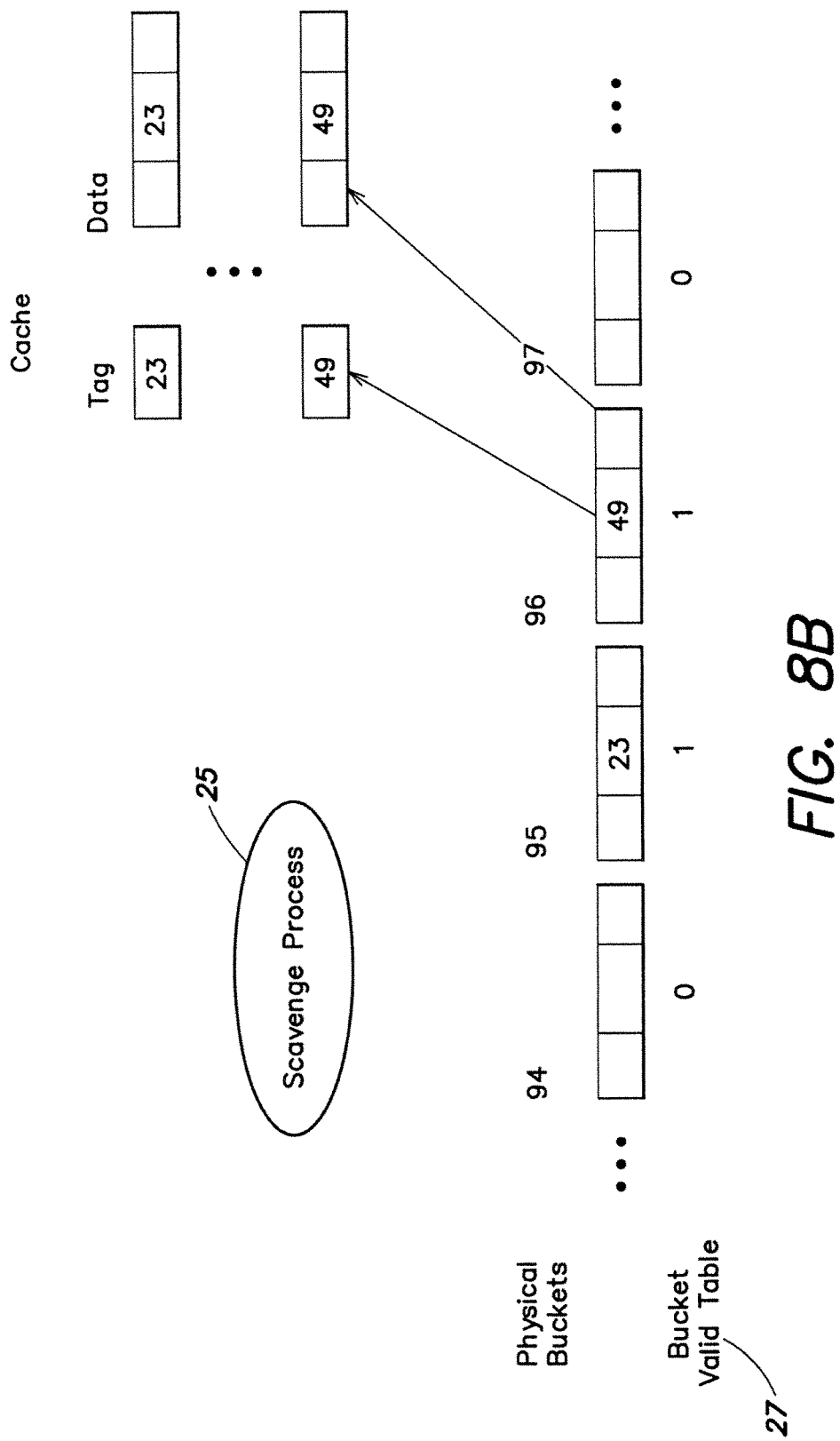

FIGS. 8A and 8B illustrate an alternative scavenging process for generating free erase blocks. This scavenging process is not a part of any indexing operation. Rather, it is implemented as part of a lower level device management layer. In this process, a group (some or all) of the physical buckets in a flash erase block are read directly from flash and the bucket valid table 27 is used to determine which buckets in the erase block are valid.

As illustrated in FIG. 8A, in step one 220, a scavenging process 25 reads a complete erase block 21a. In step two 222, the scavenging process uses the bucket valid table 27 to identify all buckets of those read that are valid. In step three 224, for each valid bucket, the logical bucket identifier is extracted from the bucket. In step four 226, the valid buckets are stored in cache 23, each indexed by its logical bucket identifier.

FIG. 8B shows an example where in step one, the scavenging process 25 reads buckets [94, 97] inclusive. In step two, the process determines that buckets at 95 and 96 are valid. The valid buckets are shown in the bucket valid table designated by a "1", and the non-valid buckets by a "0". In step three, the logical bucket identifiers for buckets 95 and 96, namely tags 23 and 49 respectively, are extracted from the buckets. In step four, the two tags, and their respective buckets 95 and 96 are inserted into cache using their respective tags 23, 49 as the index.

E. Stack Level View and Implementation

Another more specific example of the invention will now be described with respect to FIGS. 9-16.

Figure 9:
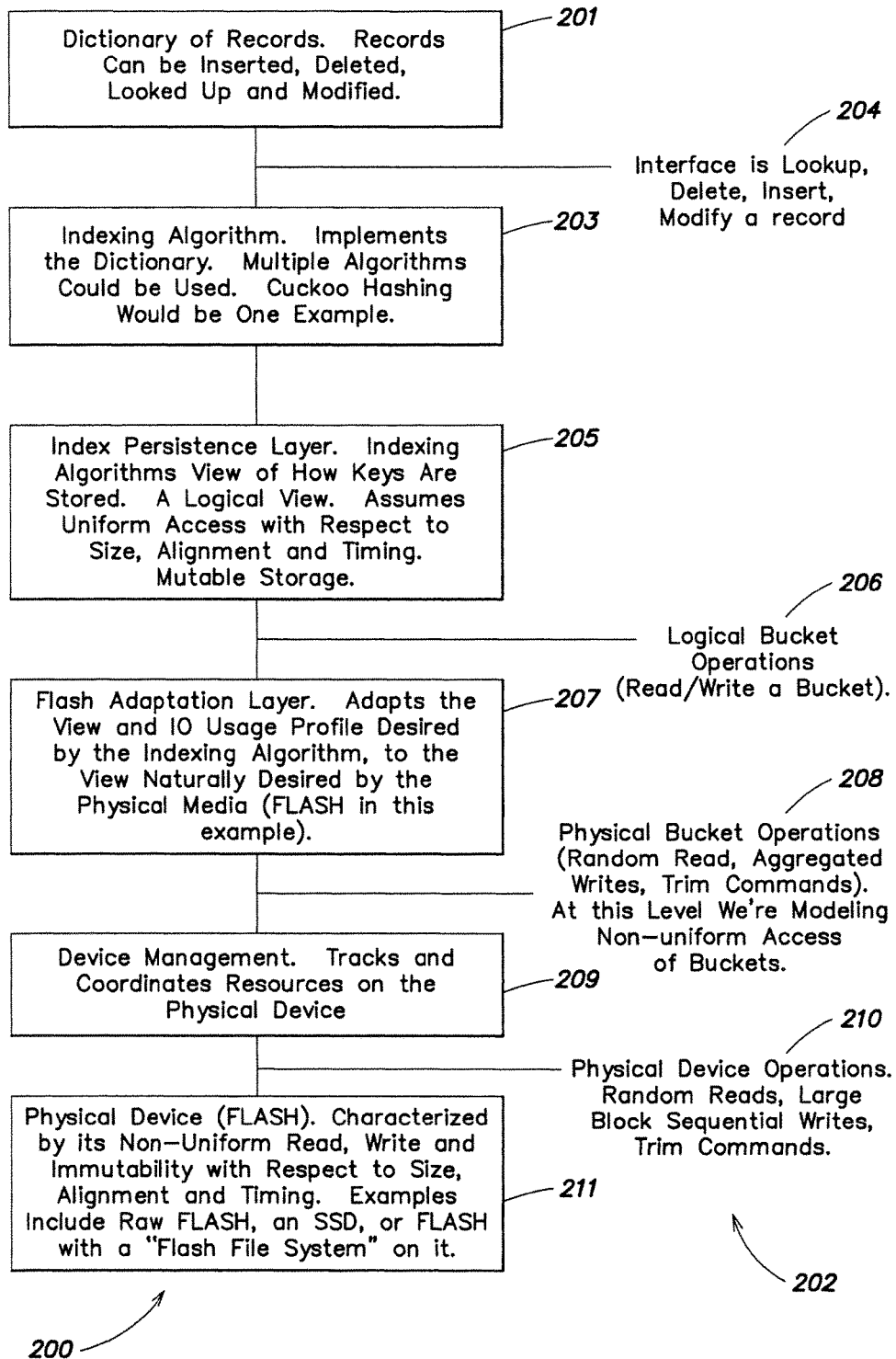
FIG. 9 is a schematic block diagram illustrating a six layer view or stack for illustrating an implementation of the present invention.

FIG. 9 shows a six layer view or stack 200 for illustrating an implementation of the present invention in which a flash adaptation layer 207 adapts an IO usage profile view desired by an indexing algorithm 203, which is a very different view than desired by the physical flash memory device 211. At the top level 201, a dictionary (index) of records is provided, for which certain indexing operations 204 (lookup, delete, insert and modify a record) are required. An indexing algorithm layer 203 implements the dictionary with one or more indexing algorithms, e.g., a cuckoo displacement hashing algorithm being one example. The indexing algorithm has a view of how the keys to the index will be stored by an index persistence layer 205. The indexing view is a logical view, specifying logical address locations. The view further assumes that there will be uniform access to the index with respect to size, alignment and timing, and that the index is stored on mutable (stable) storage.

The index persistence layer 205 will present logical bucket operations 206 for reading and writing, to physical buckets which store the records of the index. These logical bucket operations 206 are presented to a flash adaptation layer 207, which as previously described, translates the logical buckets (of the indexing process) to physical bucket locations on the flash storage device. The flash adaption layer thus adapts the view and IO usage profile desired by the indexing algorithm above, to the very different view desired by the physical storage device (flash memory 211) below. Here the physical bucket operations 208 include random reads and aggregated (block sequential) writes, which constitute a non-uniform model of bucket access. The physical bucket operations in this example may further include trim commands.

The physical bucket operations are implemented by a device management layer 209 which tracks and coordinates the resources on the physical flash device. These physical device operations 210 here include random reads, large sequential writes, and trim commands.

The physical device layer 211 is characterized by its non-uniform read and write and immutability with respect to size, alignment and timing. Examples of such physical devices include raw flash, phase-change, an SSD, and/or flash with a flash file system residing on the device.

The present invention enables additional optional enhancements below the device management layer such as:

The model of bucket trimming (fine page trimming) and tracking buckets within a page enables better Erase Block management if incorporated directly into a flash file system of an SSD or equivalent storage device.

The mapping of buckets onto flash pages is an abstraction. Buckets could map to partial-pages for SLC NAND to increase the lifetime of those devices by minimizing the amount of data written to the flash for each change. Buckets can also map onto multiple flash pages if this was beneficial to the overall system performance.

Figure 10:
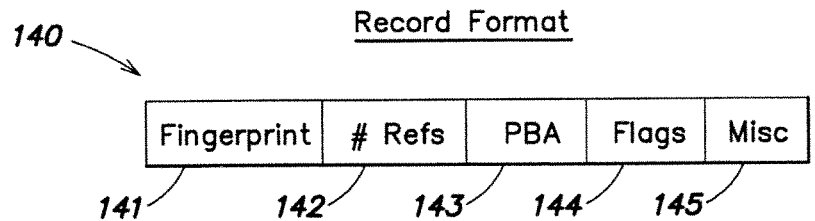
FIG. 10 is a schematic diagram of a record entry as used in one embodiment of the invention.

FIG. 10 shows one example of an index record. The record 140 is 32 bytes in total, including a first 20 byte field 141 for storing a fingerprint (key). A fingerprint is preferably a cryptographic hash digest of the data content, e.g., an SHA-1 hash algorithm. For ease of illustration, rather than typing the fingerprint in hex digits such as "AB92345E203 . . . " an individual fingerprint will be designated in FIGS. 11-14 by a single capital letter such as P, Q, R, S, T. These capital letters will also act as a proxy for the entire record, again to simplify for purposes of illustration. The fields of the record also include a two byte reference count field 142, a five byte physical block address field 143, a one byte flags field 144, and a four byte miscellaneous field 145. The PBA field 143 contains a pointer to the physical block address of the data stored on disk, for the designated fingerprint 141. The reference count tracks the number of references to the data stored on disk.

In accordance with one embodiment of the invention, the fingerprint 141 from the index record is used as an input key to the lookup function f(key) previously described (FIG. 1), In this example, the function f(key) comprises a set of four hash functions $H_0$, $H_1$, $H_2$, and $H_3$ Generally, one can use any set of two or more hash functions. The hash function $H_x$ maps the fingerprint to a range [0, N−1] inclusive, wherein N is the size of the hash table. Given that in this example the fingerprints themselves are hashes, one can extract BitFields to generate the following family of four hash values:

$H_0(x)=x<0:31>\bmod N$
$H_1(x)=x<032:63>\bmod N$
$H_2(x)=x<064:95>\bmod N$
$H_3(x)=x<096:127>\bmod N$ The BitField width extracted is greater than or equal to $\log_2 (N)$. Any combination of disjointed bits can be used, subject to the $\log_2 (N)$ constraint. As illustrated in FIG. 10, only the fingerprint in the first field 141 is hashed, to form the key. The remaining content (fields 142-145) of the record 140 comprise a value or payload.

FIG. 11 illustrates one example of a displacement hashing indexing algorithm known as cuckoo hashing. For ease of illustration, only two functions are used. FIG. 11A shows a 2×3 grid in which fingerprint P generates hash values 2 and 5 from the functions $H_0(x)$ and $H_1(x)$, respectively, while the fingerprint Q generates hash values 1 and 3 from these same functions. The cuckoo hashing algorithm will select from among the two alternative hash values for placing P and Q in one of the seven slots labeled 0-6 (FIG. 11B). P can go in one of two locations, 2 or 5, and Q can go in one of two locations, 1 or 3. The algorithm puts Q in the lowest empty slot 1 and P in slot 2, as shown in FIG. 11C. While in this example the record container is referred to as a slot holding one record, it should be understood that the invention is not so limited; indexing algorithms also view a bucket, holding multiple records, as a container. Here a single record slot is used to simplify the explanation.

Now, another fingerprint R is provided which generates hash values of 1 and 2 from the same hash functions (see table in FIG. 11D). The hashing algorithm will place R in the left location, namely slot 1, displacing the current entry Q (FIG. 11E). Q will now be moved to the other optional location specified by $H_1(Q)$, namely location 3. The algorithm will keep displacing records until each record lands in an empty slot.

In this example, to accomplish the "insert R" operation, the indexing algorithm generates the following read and write requests:
  read 1 (gets Q)
  read 2 (gets P)
  write 1 (write R)
  read 3 (validity check)
  write 3 (Q)

The first two reads are used to validate that R is not already present in the index. The validity check (read 3) determines whether slot number 3 is empty; if so, then Q can be written to slot 3 and the algorithm is done as no entry was rewritten in slot 3. If slot 3 were not empty, then the current entry in slot 3 would need to be moved to another slot. The contents of slot 3 are known if we have a Bitmap; otherwise, we need to read the entry in slot 3 to determine its status. Each entry contains a valid bit indicating if that entry is valid. Valid means it is in use (and the current occupant of the location has to be displaced). Not valid means the location is empty, and the record being processed can be written there. The contents of the valid bits can also be stored in a separate Bitmap, at the expense of some memory.

The cuckoo hashing algorithm is recursive, in that it keeps writing over entries, displacing the previous content, until it lands on an empty entry. In practice, this process rarely exceeds one displacement.

The indexing algorithm has both bucket and individual record operations. The indexing algorithm is described above (in FIG. 11) as placing one record in one container (slot), but it is understood by the indexing algorithm that the records may also be aggregated into buckets, i.e., buckets containing multiple records. Thus, the above example is nonlimiting and meant to illustrate generally record operations.

Figure 12:
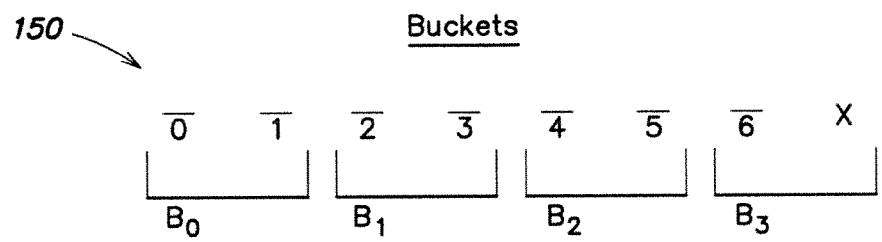
FIG. 12 is a schematic illustration of multiple buckets, each bucket holding multiple records according to one embodiment of the invention.

As previously described, because the reading and writing of individual records is not efficient to flash memory, the individual records are aggregated into buckets. FIG. 12 illustrates four such buckets 150, each containing two or more records, i.e., bucket $B_0$ with record locations 0 and 1, $B_1$ with record locations 2 and 3, $B_2$ with record locations 4 and 5, and $B_3$ with record locations 6 and x. The bucket size is a function of (and preferably is equal to) the minimum write size dictated by the flash device, i.e., either full page write or partial page write. A typical bucket size may be 4 KB. No specific ordering of records is required within the bucket—the entire bucket is searched for a valid record during the lookup operation, so that the record could be inserted at any point within the bucket. When displacing, according to the cuckoo hashing algorithm, an entry in the bucket can be displaced at random. The indexing algorithm thus writes logical buckets in what appear to be random locations, one at a time, that are eventually aggregated by the flash adaptation layer into larger physically contiguous (sequential) writes to the flash device.

Figure 13:
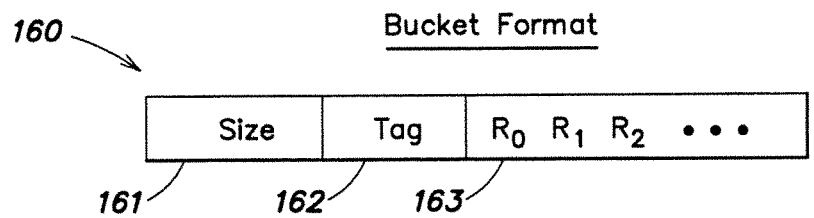
FIG. 13 is a schematic diagram of the contents of a bucket according to one embodiment of the invention.

FIG. 13 illustrates one example of a bucket entry 160. A 4 KB bucket size is based on the underlying device minimum write size, here a 4 KB page. The 4 KB bucket includes a 4 byte first field 161 that specifies the number of records in the bucket entry. A 4 byte tag field 162 specifies the logical bucket identifier. This identifier (tag) is a logical address, not a physical one. The translation table maps the algorithm bucket address (ABA) to a flash bucket address FBA. The cache operates as a virtual cache (in CPU terminology), with each cache line (entry) identified by a tag, an ABA in this case. As the algorithm requests records all it knows in going through the cache is that the ABA requested is cached; where it is mapped to (the FBA) is at the bottom end of the cache (e.g., see the reverse pointer 313 to the BTT, in FIG. 2C). The bucket includes field 163 for holding a plurality of records $R_0$, $R_1$, $R_2$ ..., each record being 32 bytes in size. In this example, a 4 KB bucket will hold: (4096−4−4)/32 records, i.e., approximately 127 records per bucket.

Figure 14:
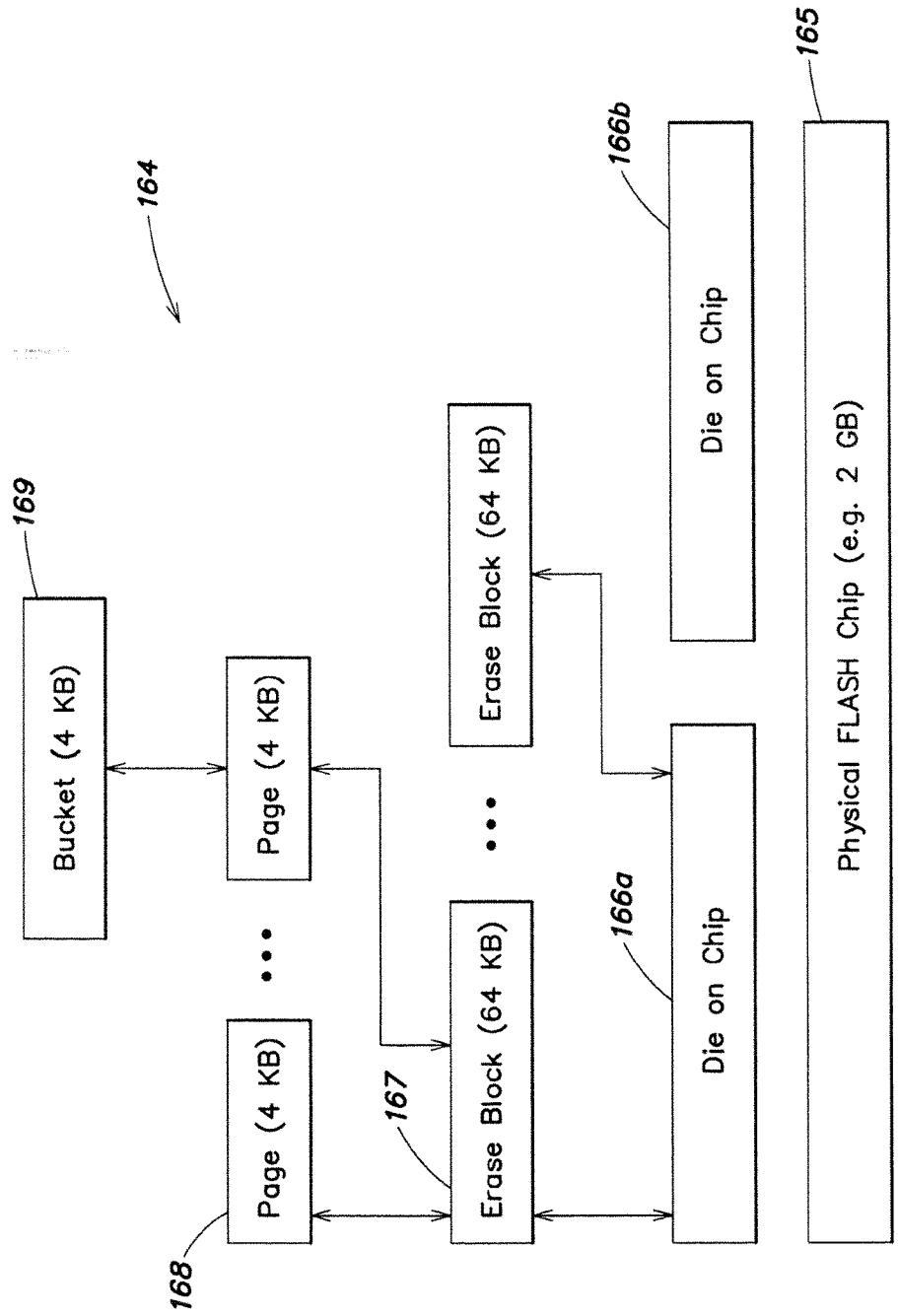
FIG. 14 is a schematic block diagram illustrating one example of a physical flash chip having multiple dies, erase blocks, pages, and buckets according to one embodiment of the invention.

FIG. 14 is a schematic diagram of a flash memory device 164 illustrating the relative sizes of a bucket, page and erase block in one embodiment. The physical flash device is a chip (package) 165 that is 2 GB in size. On the chip, there are two die (silicon wafers) 166a, 166b. On each die, there may be $2^{14}$ erase blocks, each erase block 167 typically being 64 KB. A page 168 is the minimum size that can be written, here 4 KB, and determines the size of the bucket 169, also 4 KB, as used higher up in the stack (see FIG. 9).

Figure 15A:
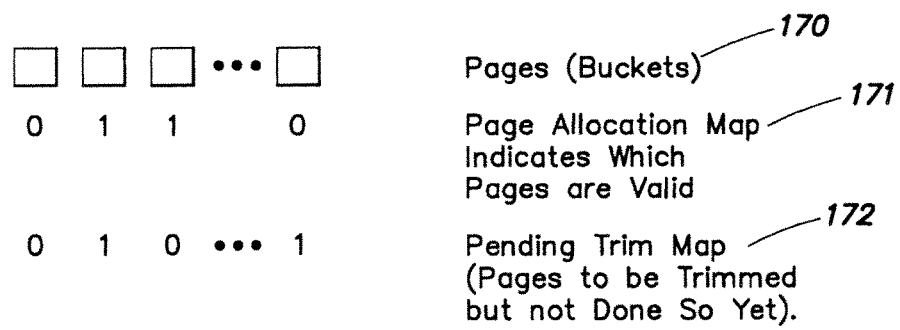
FIGS. 15A-15B illustrate certain components of a device management layer according to one embodiment of the invention.

FIG. 15 illustrates select components according to one embodiment of a device management layer (209 in FIG. 9) for tracking and coordinating the resources on the physical flash device. FIG. 15A shows (at the top) a plurality of pages (buckets) 170, followed by a page allocation map 171 indicating which pages are valid (1 is valid, 0 is not valid). Below this is a pending trim map 172, of pages to be trimmed in the future, but not yet done so. The page allocation and pending trim maps can be used in various embodiments of the invention as previously described, for determining whether a bucket holds valid data (see the bucket valid table 27 illustrated in FIG. 1).

Figure 15B:
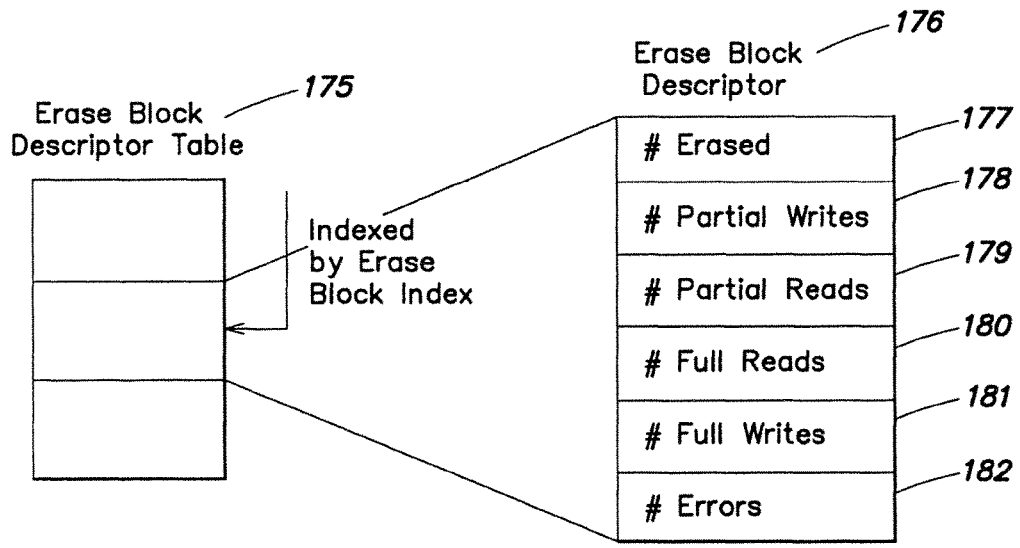

FIG. 15B illustrates one example of an erase block descriptor table 175, indexed by erase block index. Each erase block descriptor entry 176 includes a plurality of fields, including number erased 177, number of partial writes 178, number of partial reads 179, number of full reads 180, number of full writes 181, and number of errors 182. This information can be used in generating free erase blocks as previously described in various embodiments of the invention.

F. Further Embodiments

The present invention may be used to implement an index for a file system, such as that disclosed in copending and commonly owned U.S. Ser. No. 12/823,922, filed 25 Jun. 2010, entitled File System, by A. J. Beaverson and P. Bowden, filed on the same date as the present application and claiming priority to U.S. Provisional No. 61/269,633 filed 26 Jun. 2009. Priority is claimed herein to both applications and the complete disclosures of each are hereby incorporated by reference in their entirety.

Embodiments of the invention can be implemented in digital electronic circuitry, or in computer hardware, firmware, software, or in combinations thereof. Embodiments of the invention can be implemented as a computer program product, i.e., a computer program tangibly embodied in a computer-readable medium, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communications network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention.

The invention claimed is:

1. A method of adapting a uniform access indexing process with a non-uniform access memory, the method comprising:
   storing a dictionary of index records in the non-uniform access memory, each index record comprising fields for an index key, a reference count and a physical block address, the index keys being uniformly distributed and unique;
   maintaining a bucket translation table for mapping logical bucket identifiers to physical bucket locations of the memory including generating a logical bucket identifier by displacement hashing an index key, and the table comprising a mapping of the logical bucket identifier to a physical bucket location of the memory where the associated index record is stored;
   collecting in cache a plurality of bucket entries, wherein each bucket entry comprises a set of index records having the same logical bucket identifier;
   writing the collection of entries from the cache to contiguous physical bucket locations of the memory as a sequential write; and
   updating the bucket translation table with the physical bucket locations for the bucket entries of the collection written from the cache to the memory.

2. The method of claim 1 wherein the index key comprises a cryptographic hash digest of data; and
   the physical block address field contains a pointer to a physical block address of the data stored on a storage device.

3. The method of claim 1 wherein the method includes designating as read only in cache the index records written sequentially to the memory.

4. The method of claim 1 wherein the generating a logical bucket identifier by displacement hashing includes utilizing a plurality of hash functions.

5. The method of claim 1 wherein the memory comprises a flash memory device which includes a plurality of erase blocks, each erase block comprising a plurality of pages, and each page comprising a plurality of buckets.

6. The method of claim 5, including:
   performing a scavenging process to generate free erase blocks by reading erase blocks to the cache.

7. The method of claim 1, including:
   reading one or more sequential index records from the memory to the cache; and
   designating as free physical bucket locations in memory from which the one or more index records were read.

8. The method of claim 1, including:
   rendering a plurality of sequential physical bucket locations of the memory as a free block by reading any valid index records in the block to the cache and designating as free physical bucket locations of the memory from which the valid index records were read.

9. The method of claim 1, including:
   generating a plurality of logical bucket identifiers for the index key, wherein the displacement hashing function selects from among the plurality of generated logical bucket identifiers.

10. The method of claim 1, wherein:
    the memory comprises one or more of flash, phase-change, and solid state disk memory devices.

11. The method of claim 1, wherein:
    the memory is limited by one or more of random write access time, random read-modify-write access time, sequential write, alignment restrictions, erase time, erase block boundaries and wear.

12. The method of claim 1, wherein:
    the bucket size is a function of the minimum write size of the memory based on a page or partial page.

13. The method of claim 1, wherein:
    the memory has an erase block comprising a plurality of pages.

14. The method of claim 13, including:
    tracking the number of free physical bucket locations in an erase block and implementing a process to generate a free erase block when a threshold of free bucket locations is met.

15. The method of claim 13, including:
    generating free erase blocks by reading additional buckets to the cache in response to random read operations.

16. The method of claim 1 including:
    maintaining a bucket valid table for tracking which physical bucket locations of the memory are valid.

17. The method of claim 1, wherein:
    each physical bucket location of the memory comprises with the set of index records a self-index into the bucket translation table.

18. The method of claim 1, wherein:
    the index records of the bucket are not ordered.

19. The method of claim 1, wherein:
    the bucket translation table is stored in persistent memory.

20. The method of claim 1, wherein:
    the indexing process performs indexing operations based on requests that index records be inserted, deleted, looked up and/or modified.

21. The method of claim 1, wherein:
    the indexing process presents logical bucket operations for reading and writing to physical bucket locations which store the index records.

22. A non-transitory computer readable medium storing instructions executable by a processor, the non-transitory machine readable medium comprising instructions to:
  store a dictionary of index records in the non-uniform access memory, each index record comprising fields for an index key, a reference count and a physical block address, the index keys being uniformly distributed and unique;
  maintain a bucket translation table for mapping logical bucket identifiers to physical bucket locations of the memory, wherein a logical bucket identifier being generated by displacement hashing an index key, and the table comprising a mapping of the logical bucket identifier to a physical bucket location of the memory where the associated index record is stored;
  collect in cache a plurality of bucket entries, wherein each bucket entry comprises a set of index records having the same logical bucket identifier;
  write the collection of entries from the cache to contiguous physical bucket locations of the memory as a sequential write; and
  update the bucket translation table with the physical bucket locations for the bucket entries of the collection written from the cache to the memory.

23. The non-transitory computer readable medium of claim 22 further comprising instructions to:
  read one or more sequential index records from the memory to the cache; and
  designating as free physical bucket locations in memory from which the one or more index records were read.

24. The non-transitory computer readable medium of claim 22 further comprising instructions to:
  render a plurality of sequential physical bucket locations of the memory as a free block by reading any valid index records in the block to the cache and designating as free physical bucket locations of the memory from which the valid index records were read.

25. The non-transitory computer readable medium of claim 22 further comprising instructions to:
  generate free erase blocks by reading additional buckets to the cache in response to random read operations, wherein each erase block comprises a plurality of pages.

26. The non-transitory computer readable medium of claim 22,
  wherein the memory comprises a flash memory device which includes a plurality of erase blocks, each erase block comprising a plurality of pages, and each page comprising a plurality of buckets, and
  the non-transitory computer readable medium further comprising instructions to perform a scavenging process to generate free erase blocks by reading erase blocks to the cache.

27. A computer system comprising:
  a non-uniform access memory containing a dictionary of index records stored in physical bucket locations of the memory, each index record comprising fields for an index key, a reference count and a physical block address, the index keys being uniformly distributed and unique;
  a processor; and
  non-transitory machine readable medium storing instructions that, when executed, cause the processor to:
    maintain a bucket translation table to map a logical bucket identifier, generated by displacement hashing an index key of the dictionary, to a physical bucket location of the memory where an index record associated with the index key is stored;
    collect bucket entries in a cache, each bucket entry comprising a set of index records having the same logical bucket identifier to be written to the memory;
    write sequentially a collection of the bucket entries from the cache to contiguous physical bucket locations of the memory; and
    update the bucket translation table with the physical bucket locations for the bucket entries of the collection.

28. The system of claim 27 wherein:
the memory that stores the index comprises a physical device layer characterized by non-uniform read and write access and immutability with respect to size, alignment and timing.

29. The system of claim 27 wherein:
the memory that stores the index comprises one or more of flash, phase-change and solid state disk memory devices.

30. The system of claim 27 wherein:
the memory that stores the index comprises a flash memory device which includes a plurality of erase blocks, each erase block comprises a plurality of pages, and each page comprises a plurality of buckets.

* * * * *